(12) United States Patent  
Sugaya

(10) Patent No.: US 8,391,193 B2  
(45) Date of Patent: Mar. 5, 2013

(54) WIRELESS COMMUNICATION DEVICE, WIRELESS COMMUNICATION SYSTEM, WIRELESS COMMUNICATION METHOD, AND COMPUTER PROGRAM

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 486 days.

(21) Appl. No.: 12/646,467

(22) Filed: Dec. 23, 2009

(65) Prior Publication Data

US 2010/0177720 A1    Jul. 15, 2010

(30) Foreign Application Priority Data

Jan. 9, 2009  (JP) ................ P2009-003973

(51) Int. Cl.
*H04B 7/00* (2006.01)
*H04W 4/00* (2009.01)
*H04J 3/16* (2006.01)
*H04J 3/22* (2006.01)
*H04J 3/24* (2006.01)

(52) U.S. Cl. .......... 370/310; 370/329; 370/473
(58) Field of Classification Search .......... None
See application file for complete search history.

(56) References Cited

U.S. PATENT DOCUMENTS 7,675,878 B2 * 3/2010 Simpson et al. ........... 370/310.2
8,036,152 B2 * 10/2011 Brown et al. .............. 370/311

FOREIGN PATENT DOCUMENTS

| JP | 2005-101756 | 4/2005 |
| JP | 2005-142883 | 6/2005 |
| JP | 2007-166196 | 6/2007 |
| JP | 2008-124524 | 5/2008 |
| WO | WO 99/16190 | 4/1999 |
| WO | WO-2006/093297 A1 | 9/2006 |

OTHER PUBLICATIONS

"Distributed Medium Access Control (MAC) for Wireless Networks", WiMedia Alliance, Release 1.01, pp. cover page, 12, 86-87, 92-93, and 135-138, (2006).

* cited by examiner

*Primary Examiner* — Xavier Szewai Wong
(74) *Attorney, Agent, or Firm* — Finnegan Henderson Farabow Garrett & Dunner LLP

(57) ABSTRACT

There is provided a wireless communication device including a beacon signal exchanging unit for exchanging a beacon signal with another wireless communication device, a connection management unit for establishing a connection relationship with the another wireless communication device by exchanging the beacon signal, a pause management unit for exchanging information on a predetermined pause period with the another wireless communication device, with which the connection relationship is established, and pausing the own operation until the predetermined pause period has elapsed from the predetermined time, and a beacon slot management unit for setting a beacon slot to be used for transmission of the beacon signal. The beacon slot management unit sets the beacon slot after elapse of the predetermined pause period, and the beacon signal exchanging unit transmits the signal for a predetermined period using the beacon slot after the predetermined pause period has elapsed and the beacon slot is set.

17 Claims, 16 Drawing Sheets

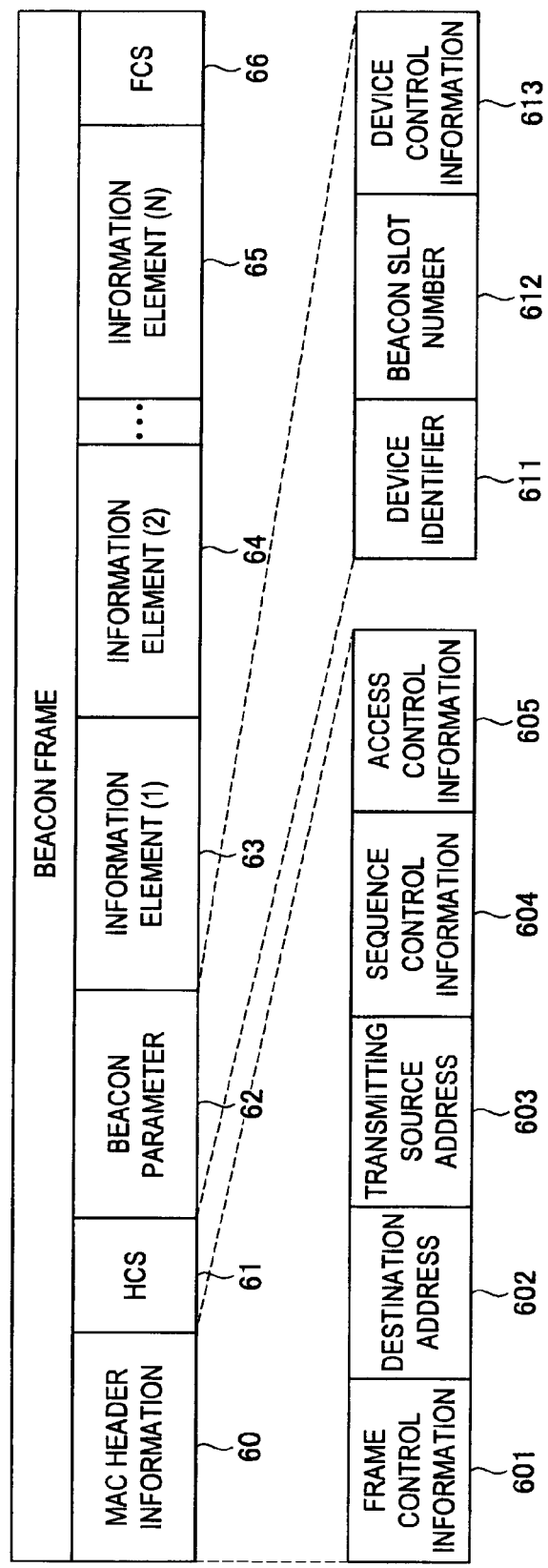

FIG. 6C

| ELEMENT IDENTIFIER | INFORMATION LENGTH | PAIRING TYPE | HOST/GUEST IDENTIFIER | OWN MAC ADDRESS | COUNTERPART MAC ADDRESS | LONG CYCLE SYNCHRONIZATION PERIOD SET VALUE | PAUSE START TIME INFORMATION |
|---|---|---|---|---|---|---|---|
| 631 | 632 | 633 | 634 | 635 | 636 | 637 | 638 |

PAIRING INFORMATION ELEMENT

FIG. 6D

| ELEMENT IDENTIFIER | INFORMATION LENGTH | COUNTERPART MAC ADDRESS | UPPER LEVEL PROTOCOL STARTUP NECESSITY | NOTIFICATION PARAMETER INFORMATION (AS NEEDED) |
|---|---|---|---|---|
| 641 | 642 | 643 | 644 | 645 |

COMMUNICATION REQUEST INFORMATION ELEMENT

WIRELESS COMMUNICATION DEVICE, WIRELESS COMMUNICATION SYSTEM, WIRELESS COMMUNICATION METHOD, AND COMPUTER PROGRAM

BACKGROUND OF THE INVENTION

1. Field of the Invention

The present invention relates to a wireless communication device, a wireless communication system, a wireless communication method, and a computer program.

2. Description of the Related Art

A method of building a wireless network by a plurality of wireless communication devices is generally used. Among them, WiMedia Distributed MAC Specification clearly describes a mechanism in which each wireless communication device builds a network in an autonomous distributed control. This specification describes determining a beacon period to a predetermined superframe cycle, and having each wireless communication device exchange beacon signals within the beacon period.

A method of grasping the connection relationship with each other, maintaining the network and implementing data transmission through exchange of the beacon signals is described. In other words, a method of exchanging its address information and address information of a communication device existing at the periphery, and information of a beacon slot being used on its beacon signal, as predetermined network management information, is described.

Furthermore, the specification discloses a configuration capable of implementing low power consumption operation of a certain extent by having the communication device repeat a dormant operation and an activity operation at a cycle of a certain extent for hibernation (dormant) operation. For the hibernation operation, the communication device in hibernation is assumed to have a configuration of continuously using a beacon slot in the beacon period even during hibernation. Specifically, other communication devices existing at the periphery of the communication device in hibernation operation have a configuration of notifying the other newly entered communication device of the continuous use of the beacon slot.

A technique related to hibernation operation is disclosed in Japanese Patent Application Laid-Open No. 2007-166196 and Japanese Patent Application Laid-Open No. 2008-124524. Japanese Patent Application Laid-Open No. 2007-166196 describes a method of waking up the communication terminal device at low cost using a beacon of a pulse signal different from a data communication signal. Japanese Patent Application Laid-Open No. 2008-124524 describes a method of using a low-speed clock to maintain time synchronization with the base station and using a high-speed clock to receive signals from the base station.

SUMMARY OF THE INVENTION

However, in a wireless network built by a plurality of wireless communication devices, the communication device is activated at a cycle of a certain extent in the hibernation operation from the related art, and thus the dormant operation is difficult to define for a long period of time and the power consumption increases. If the hibernation state is once resolved, the connection is to be checked again at the time of activation.

Even when transmission demand such as data communication is not made, the beacon signals are to be exchanged at a predetermined cycle to ensure the connection for the network. Thus, a predetermined power continues to be consumed even when data transmission is not performed.

In the hibernation operation of the related art, notification that the beacon slot in hibernation is being used is to be made by other communication devices existing at the periphery. Thus, when the communication device no longer exists, the relevant beacon slot may be used by a newly entered communication device. In such a case, its beacon slot is being used by another communication device when activated from the hibernation operation, and thus an issue of competition of the beacon slot arises. Furthermore, the issue of competition of the beacon slot similarly arises even when the beacon slot in hibernation moves to a space used in another communication device with the movement of the communication device.

The technique disclosed in Japanese Patent Application Laid-Open No. 2007-166196 has an issue in that a beacon signal receiving unit is to be activated at all times. A method of accumulating power in a charging circuit and operating a latch circuit by having the beacon signal as a pulse signal of a constant cycle is described, but information may not be transmitted on the beacon signal.

Furthermore, in the technique disclosed in Japanese Patent Application Laid-Open No. 2008-124524, signals from the base station of other cells are also received other than from the own cell when receiving signals from the base station, and the frequency error is measured using a high speed clock and synchronization is taken for the synchronization of the own cell. Therefore, in the technique disclosed in Japanese Patent Application Laid-Open No. 2008-124524, application to a method of synchronization when the base station that transmits signals on a constant basis does not exist is difficult.

In light of the foregoing, it is desirable to provide a novel and improved wireless communication device, a wireless communication system, a wireless communication method, and a computer program capable of realizing the hibernation operation, in which network management is simplified, at low power consumption.

According to an embodiment of the present invention, there is provided a wireless communication system including a first wireless communication device and a second wireless communication device. The first wireless communication device includes a beacon signal exchanging unit for exchanging a beacon signal with the second wireless communication device, a connection management unit for establishing a connection relationship with the second wireless communication device by exchanging the beacon signal, a pause management unit for exchanging information on a predetermined pause period with the second wireless communication device, with which the connection relationship is established, and pausing the own operation until the predetermined pause period has elapsed from a predetermined time, and a beacon slot management unit for setting a beacon slot to be used for transmission of the beacon signal, the beacon slot management unit sets the beacon slot after elapse of the predetermined pause period, the beacon signal exchanging unit transmits the beacon signal for a predetermined period using the beacon slot after the predetermined pause period has elapsed and the beacon slot is set. The second wireless communication device includes a beacon signal exchanging unit for exchanging a beacon signal with the first wireless communication device, a connection management unit for establishing a connection relationship with the first wireless communication device by exchanging the beacon signal, a pause management unit for exchanging information on a predetermined pause period with the first wireless communication device, with which the connection relationship is established, and pausing the own operation until the predetermined pause period has elapsed from the predetermined time, and a beacon slot management unit for setting a beacon slot to be used for transmission of the beacon signal, and the pause management unit executes a predetermined operation in subordination to the beacon signal, transmitted from the first wireless communication device, received by the beacon signal exchanging unit after elapse of the predetermined pause period.

According to another embodiment of the present invention, there is provided a wireless communication device including a beacon signal exchanging unit for exchanging a beacon signal with another wireless communication device, a connection management unit for establishing a connection relationship with the another wireless communication device by exchanging the beacon signal, a pause management unit for exchanging information on a predetermined pause period with the another wireless communication device, with which the connection relationship is established, and pausing the own operation until the predetermined pause period has elapsed from the predetermined time, and a beacon slot management unit for setting a beacon slot to be used for transmission of the beacon signal. The beacon slot management unit sets the beacon slot after elapse of the predetermined pause period, and the beacon signal exchanging unit transmits the beacon signal for a predetermined period using the beacon slot after the predetermined pause period has elapsed and the beacon slot is set.

The beacon slot management unit may build a superframe after elapse of the predetermined pause period, the beacon signal exchanging unit may transmit the beacon signal based on the superframe built by the beacon slot management unit, and the pause management unit may again pause the own operation until the predetermined pause period has elapsed when the beacon signal exchanging unit transmits the beacon signal for a predetermined number of times after the elapse of the predetermined pause period.

The beacon signal exchanging unit may transmit information to be notified to the another wireless communication device by being embedded in the beacon signal to be transmitted to the another wireless communication device after the elapse of the predetermined pause period.

When a communication demand with the another wireless communication device is detected after the elapse of the predetermined pause period, information for transitioning the another wireless communication device to an operating state may be transmitted to the another wireless communication device.

The beacon signal exchanging unit may transmit information for transitioning the another wireless communication device to the operating state by being embedded in the beacon signal to be transmitted to the another wireless communication device.

When grasping that the another wireless communication device transitioned to the operating state and the information to be notified to the another wireless communication device is transmitted, the pause management unit may again pause the own operation until the predetermined pause period has elapsed.

The connection management unit may cancel the connection relationship with the another wireless communication device when grasping that the beacon signal transmitted by the beacon signal exchanging unit is not recognized by the another wireless communication device for a predetermined startup check period.

According to another embodiment of the present invention, there is provided a wireless communication device including a beacon signal exchanging unit for exchanging a beacon signal with another wireless communication device, a connection management unit for establishing a connection relationship with the another wireless communication device by exchanging the beacon signal, a pause management unit for exchanging information on a predetermined pause period with the another wireless communication device, with which the connection relationship is established, and pausing the own operation until the predetermined pause period has elapsed from the predetermined time, and a beacon slot management unit for setting a beacon slot to be used for transmission of the beacon signal. The pause management unit executes a predetermined operation in subordination to the beacon signal, transmitted from the another wireless communication device, received by the beacon signal exchanging unit after elapse of the predetermined pause period.

The beacon slot management unit may build a superframe after elapse of the predetermined pause period, the beacon signal exchanging unit may transmit the beacon signal based on the superframe built by the beacon slot management unit, and the pause management unit may again pause the own operation until the predetermined pause period has elapsed when grasping that the beacon signal transmitted by the beacon signal exchanging unit is recognized by the another wireless communication device.

The beacon signal exchanging unit may transmit information to be notified to the another wireless communication device by being embedded in the beacon signal to be transmitted to the another wireless communication device after the elapse of the predetermined pause period.

When a communication demand with the another wireless communication device is detected after the elapse of the predetermined pause period, information for transitioning the another wireless communication device to an operating state may be transmitted to the another wireless communication device.

The beacon signal exchanging unit may transmit information for transitioning the another wireless communication device to the operating state by being embedded in the beacon signal to be transmitted to the another wireless communication device.

When grasping that the another wireless communication device transitioned to the operating state and the information to be notified to the another wireless communication device is transmitted, the pause management unit may again pause the own operation until the predetermined pause period has elapsed.

The connection management unit may cancel the connection relationship with the another wireless communication device when grasping that the beacon signal transmitted by the beacon signal exchanging unit is not recognized by the another wireless communication device for a predetermined startup check period.

According to another embodiment of the present invention, there is provided a wireless communication method, including the steps of exchanging a beacon signal with another wireless communication device, establishing a connection relationship with the another wireless communication device by exchanging the beacon signal, exchanging information on a predetermined pause period with the another wireless communication device, with which the connection relationship is established, pausing the own operation until the predetermined pause period has elapsed from the predetermined time, and executing a predetermined operation in subordination to the beacon signal, transmitted from the another wireless communication device, received in the beacon signal exchanging step, after elapse of the predetermined pause period.

According to another embodiment of the present invention, there is provided a computer program for causing a computer to execute the steps of exchanging a beacon signal with another wireless communication device, establishing a connection relationship with the another wireless communication device by exchanging the beacon signal, exchanging information on a predetermined pause period with the another wireless communication device, with which the connection relationship is established, pausing the own operation until the predetermined pause period has elapsed from the predetermined time, and executing a predetermined operation in subordination to the beacon signal, transmitted from the another wireless communication device, received in the beacon signal exchanging step, after elapse of the predetermined pause period.

According to the embodiments of the present invention described above, there can be provided a novel and improved wireless communication device, a wireless communication system, a wireless communication method, and a computer program capable of realizing the hibernation operation, in which network management is simplified, at low power consumption.

BRIEF DESCRIPTION OF THE DRAWINGS

FIG. 6A is an explanatory view showing a configuration example of a beacon frame;

FIG. 6C is an explanatory view showing a configuration of an information element added to the beacon frame, as necessary;

FIG. 6D is an explanatory view showing a configuration of an information element added to the beacon frame, as necessary;

DETAILED DESCRIPTION OF THE EMBODIMENTS

Figure 1:
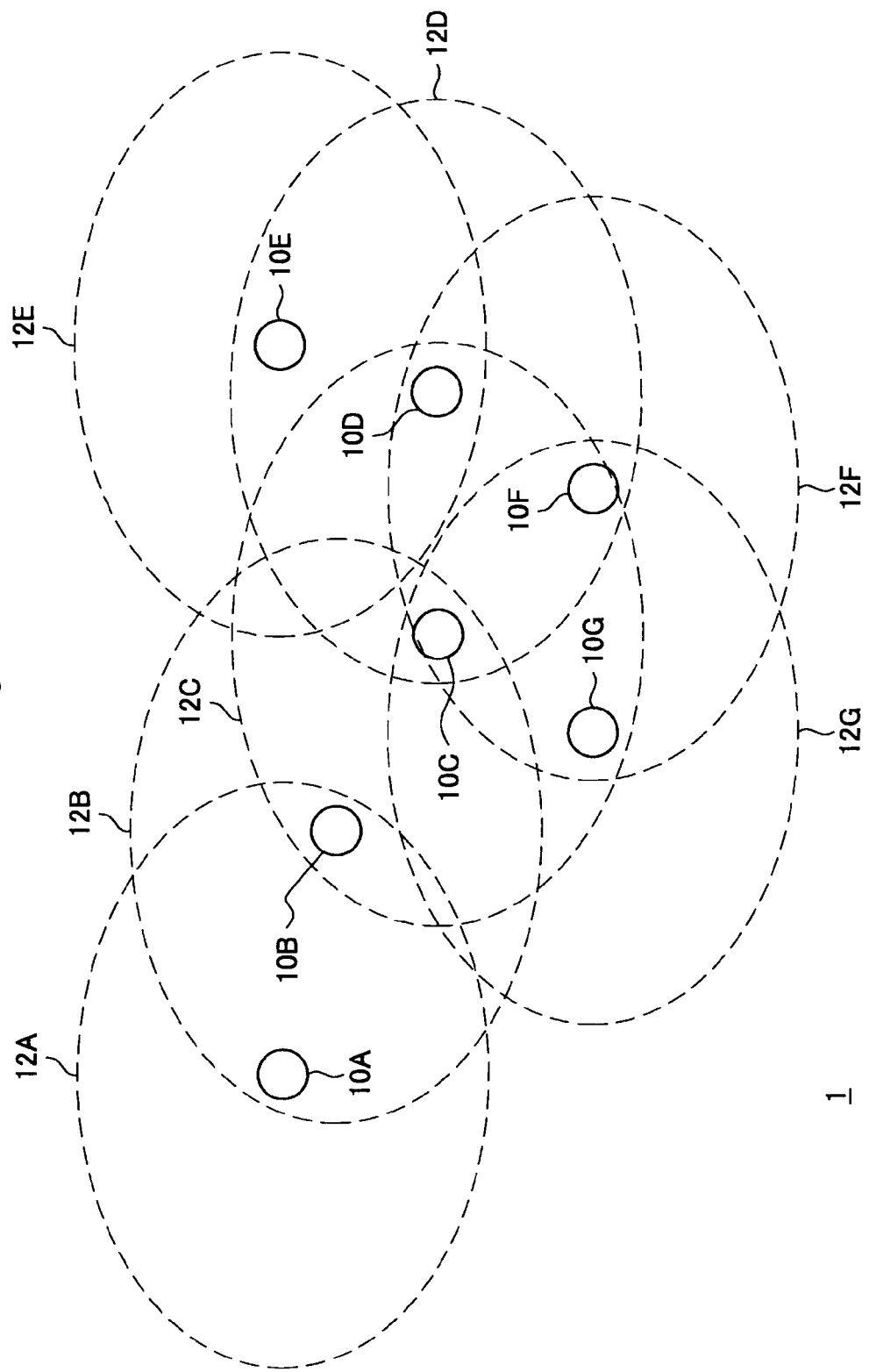
FIG. 1 is an explanatory view showing a configuration example of a wireless communication system 1 according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described in detail according to the following order.
<1. Regarding wireless communication system>
　[1-1. Configuration of wireless communication system]
　[1-2. Time division control in wireless communication system]
<2. Hibernation process of wireless communication system of the related art>
<3. Embodiment of the present invention>
　[3-1. Hibernation process according to the embodiment of the present invention]
　　[3-1-1. Hibernation process in wireless communication device on host side]
　　[3-1-2. Hibernation process in wireless communication device on guest side]
　[3-2. Configuration of beacon frame]
　[3-3. Pause operation of long cycle synchronization]
　[3-4. Configuration of host side wireless communication device]
　[3-5. Configuration of guest side wireless communication device]
　[3-6. Pairing operation]
　[3-7. Operation of host side wireless communication device]
　[3-8. Operation of guest side wireless communication device]
　[3-9. Process of setting beacon slot]
<4. Summary>
<1. Regarding Wireless Communication System>
[1-1. Configuration of Wireless Communication System]

First, the configuration of a wireless communication system according to the embodiment of the present invention will be described. FIG. 1 is an explanatory view showing a configuration example of a wireless communication system 1 according to the embodiment of the present invention.

The circle marks in FIG. 1 indicate wireless communication devices 10A to 10G, and regions indicated with a dotted line indicate electric wave reaching ranges 12A to 12G in which respective wireless communication devices 10A to 10G can communicate.

Specifically, the wireless communication device 10A can communicate with the wireless communication device 10B contained in the electric wave reaching range 12A. The wireless communication device 10B can communicate between the wireless communication device 10A and the wireless communication device 10C contained in the electric wave reaching range 12B. Similarly, the wireless communication device 10C can communicate between the wireless communication device 10B, the wireless communication device 10D, the wireless communication device 10F, and the wireless communication device 10G. The wireless communication device 10D can communicate between the wireless communication device 10C, the wireless communication device 10E, and the wireless communication device 10F. The wireless communication device 10E can communicate with the wireless communication device 10D.

The wireless communication device 10F can communicate with the wireless communication device 10C, the wireless communication device 10D, and the wireless communication device 10G contained in the electric wave reaching range 12F. Similarly, the wireless communication device 10G can communicate with the wireless communication device 10C and the wireless communication device 10F.

Each of the wireless communication devices 10A to 10G forms an autonomous distributed wireless network (adhoc network) by transmitting and receiving beacon serving as communication management information at a predetermined cycle. Each of the wireless communication devices 10A to 10G configuring the wireless network can transmit and receive various types of transmission data. Various types of transmission data include music data such as music, lecture, and radio program, video data such as movie, television program, video program, photograph, document, picture, and figure, and arbitrary data such as game and software.

The wireless communication devices 10A to 10G are collectively referred to simply as a wireless communication device 10 if the wireless communication devices do not need to be particularly distinguished, and the electric wave reaching ranges 12A to 12G are collectively referred to simply as an electric wave reaching range 12 if the electric wave reaching ranges 12A to 12G do not need to be particularly distinguished. FIG. 1 shows the wireless communication system 1, and at the same time, shows the wireless network, where the wireless communication system 1 and the wireless network may be used substantially synonymously. However, the term network generally refers to a structural body including links in addition to nodes (wireless communication devices), and hence the wireless network can be assumed as differing from the wireless communication system 1 in terms of including the links in addition to the wireless communication devices 10A to 10G.

The wireless communication device 10 may be an information processing device such as a PC (Personal Computer), a home video processing device (DVD recorder, video cassette recorder, etc.), a portable telephone, a PHS (Personal Handyphone System), a portable music reproducing device, a portable video processing device, a PDA (Personal Digital Assistant), a home game machine, a portable game machine, or home electronics. The wireless communication device 10 may be externally connected to or built into the above information processing device functioning as an application device.

[1-2. Time Division Control in Wireless Communication System]

The configuration example of the autonomous distributed wireless communication system 1 has been described above. A superframe for time division control in the wireless communication system 1 will now be described with reference to FIG. 2.

Figure 2:
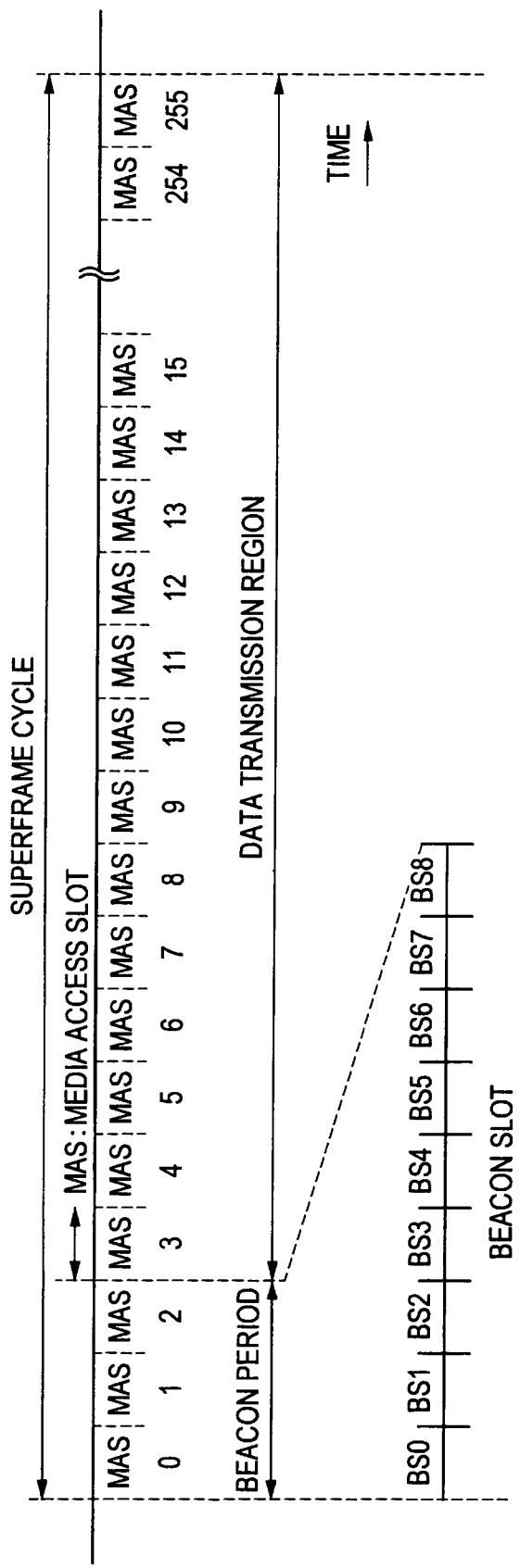
FIG. 2 is an explanatory view showing a configuration example of a superframe.

FIG. 2 is an explanatory view showing a configuration example of a superframe. The cycle of the superframe is defined by a predetermined time (e.g., 65 ms), and is segmentalized to 256 media access slots (MAS; Media Access Slot). The wireless communication device 10 configuring one wireless network shares the superframe cycle as a frame of a predetermined cycle, and the message is transferred with the segmentalized MAS as a unit.

Furthermore, a beacon period (BP, second period) serving as a management region for performing transmission and reception of the management information by the beacon (beacon signal) is at the head of the superframe, and a beacon slot (BS) is arranged at a predetermined interval. A unique beacon slot is set for every wireless communication device 10, and parameters for performing management of the network and the access control are exchanged with the peripheral wireless communication device 10. In FIG. 2, an example in which nine beacon slots of BS0 to BS8 are set as the beacon period is shown. The period (first period) that is not set as the beacon period is normally used as a data transmission region.

Figure 3:
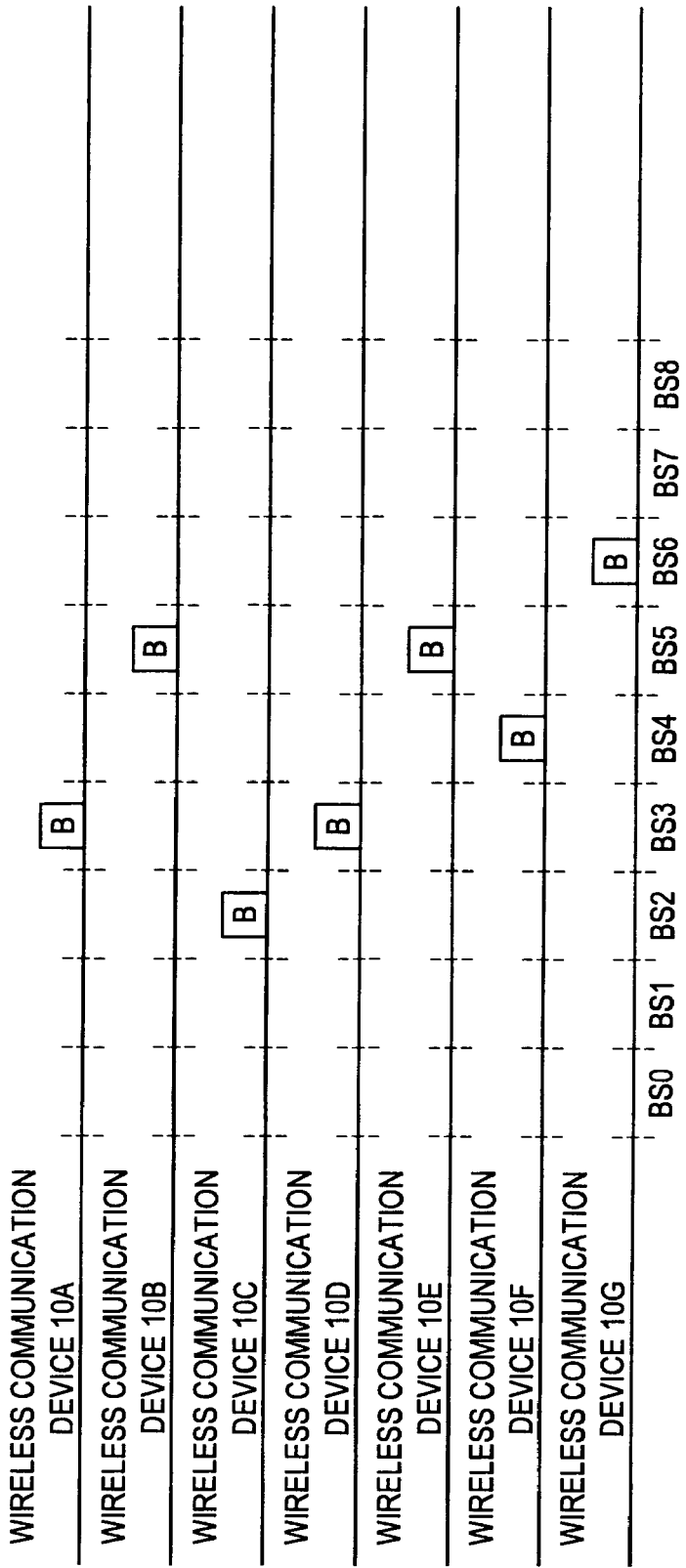
FIG. 3 is a conceptual view showing a beacon slot position of the own device set by each wireless communication device.

FIG. 3 is a conceptual view showing the beacon slot position of the own device set by each wireless communication device 10 when the wireless communication device 10A to the wireless communication device 10G form one wireless communication system. Here, a state in which the beacon slot to be used by the own device is selected when respective wireless communication devices 10 configuring one wireless communication system 1 notify each other of the beacon slot that is not used in the beacon period.

In the example shown in FIG. 3, the wireless communication device 10A transmits the beacon of the own device in the BS3, and the wireless communication device 10B transmits the beacon of the own device in the BS5. Similarly, the wireless communication device 10C transmits the beacon of the own device in the BS2, and the wireless communication device 10D transmits the beacon of the own device in the BS3. The wireless communication device 10E transmits the beacon of the own device in the BS5. The wireless communication device 10F transmits the beacon of the own device in the BS4, and the wireless communication device 10G transmits the beacon of the own device in the BS6.

In the example shown in FIG. 3, the wireless communication device 10A and the wireless communication device 10D use the common BS3, and the wireless communication device 10B and the wireless communication device 10E use the common BS5. However, the wireless communication device 10A and the wireless communication device 10D are spaced apart by greater than or equal to three hops, and the wireless communication device 10B and the wireless communication device 10E are spaced apart by greater than or equal to three hops, and hence no trouble occurs even if a plurality of wireless communication devices uses a common BS.

The BS0, BS1, BS7, and BS8 are secured, as necessary, for a wireless communication device newly entering the wireless communication system 1. A predetermined number of vacant beacon slot is provided behind the beacon slot of the own device. Such vacant beacon slots are prepared for when a new wireless communication device is newly entered.

The time division control in the wireless communication system 1 has been described above. A hibernation process in the wireless communication system 1 according to the embodiment of the present invention will now be described. First, the hibernation process in the present embodiment will be described after describing the hibernation process of the wireless communication system of the related art.

<2. Hibernation Process of Wireless Communication System of the Related Art>

Figure 14:
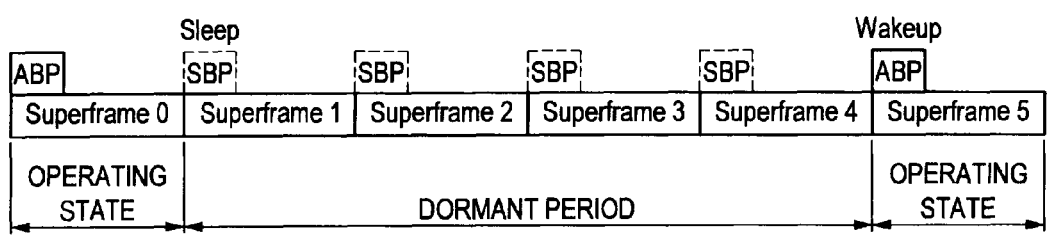
FIG. 14 is an explanatory view for describing the operation in a hibernation process of a wireless communication system of the related art.

FIG. 14 is an explanatory view for describing the operation in the hibernation process of the wireless communication system of the related art. The wireless communication device is in an operating state in the lead superframe cycle 0 (Superframe 0), and the beacons are exchanged in a predetermined beacon period. APB (Active Beacon Period) is shown to indicate the operating state in the lead superframe cycle.

In this case, the wireless communication device transitioning to the hibernation state notifies that the hibernation operation continues for a specified hibernation period from the subsequent superframe. In this case, beacons are not exchanged in the superframe cycles 1 to 4 (superframes 1 to 4) during the hibernation period. However, the peripheral (not dormant) wireless communication device notifies that the beacon slot used by the wireless communication device that transitioned to the hibernation state is maintained in the using state.

At the peripheral wireless communication device, when the beacon described of subsequently entering the hibernation operation is received in the superframe period 0, such beacon slot is in hibernation and is virtually handled as having beacon reception during the specified hibernation period even if the beacon is not received. In FIG. 14, the beacon period in the superframe cycles 1 to 4 or the hibernation period is indicated as SBP (Sleep Beacon Period).

In the superframe cycle 5 (Superframe 5) after the hibernation period is finished, the wireless communication device returns (wakes up) from the dormant state to be in the operating state. The wireless communication device that returned from the dormant state transmits beacons in the same beacon slot as the beacon slot used before returning from the dormant state.

That is, in the hibernation mode in the wireless communication system of the related art, it has been difficult to carry out the hibernation operation unless another wireless communications that is not dormant exists at the periphery. Furthermore, when a different communication device appears during the hibernation operation, the beacon slot the own device used is again used, and hence the beacon slot to be used by the own device has to be set again.

The hibernation process and the difficulties thereof of the wireless communication system of the related art have been described above. The hibernation process according to the embodiment of the present invention will now be described.

<3. Embodiment of the Present Invention>

[3-1. Hibernation Process According to the Embodiment of the Present Invention]

Figure 4:
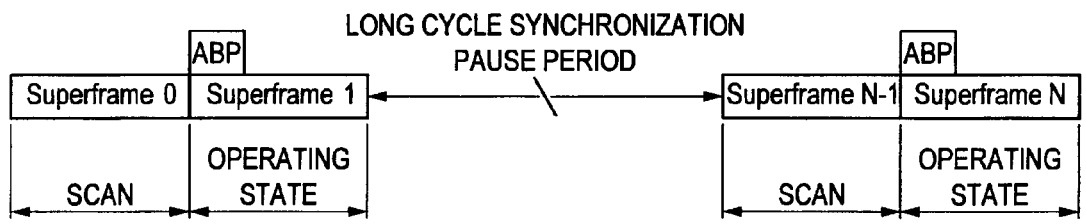
FIG. 4 is an explanatory view for describing a hibernation process according to the embodiment of the present invention.
Figure 5:
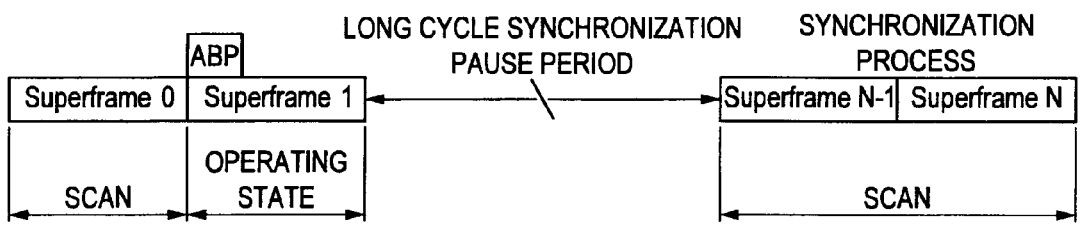
FIG. 5 is an explanatory view for describing a hibernation process according to the embodiment of the present invention.

FIGS. 4 and 5 are explanatory views for describing the hibernation process according to the embodiment of the present invention. In the present embodiment, two wireless communication devices form a pair, and the wireless communication devices that formed a pair transition to a long cycle pause mode. In the following description, the concept of host and guest will be defined with respect to the wireless communication devices that formed a pair. A characteristic lies in that the wireless communication device on the host side transmits the beacon to the wireless communication device on the guest side after the hibernation period is terminated.

[3-1-1. Hibernation Process in Wireless Communication Device on Host Side]

First, an example of the hibernation process in the wireless communication device on the host side will be described. FIG. 4 is an explanatory view for describing an example of the hibernation process in the wireless communication device on the host side in the wireless communication system according to the present embodiment.

In the example shown in FIG. 4, although not operating in the superframe cycle 0 (Superframe 0), the scan operation is executed at the pre-stage of the superframe in which the device is in the operating state, and the beacon period is shared with another wireless communication device existing at the periphery. In the superframe cycle 0, an available vacant beacon slot that is not competed with another wireless communication device is set. In the example shown in FIG. 4, the scan operation is executed only in one superframe cycle, but the present invention is not limited to such example, and the scan operation may be executed over a plurality of superframe cycles.

The wireless communication device on the host side then transmits the beacon from the next superframe cycle 1 (Superframe 1) to build the network. Although the beacon transmitting operation is shown as being carried out only in one superframe cycle in FIG. 4, the present invention is not limited to such example, and the beacon transmitting operation may be executed over a few superframe cycles.

Thereafter, the wireless communication device on the host side performs the pause operation without building the wireless network over a time defined as a long cycle synchronization pause period in advance, so that the beacon slot used by the wireless communication device on the host side up to this point can be used by another communication device.

When arriving at the superframe cycle N−1 (Superframe N−1) corresponding to the long cycle synchronization pause period, the wireless communication device on the host side again executes the scan operation as a pre-stage of the superframe in which the device is in the operating state. With the execution of the scan operation, the beacon period is shared with another communication device existing at the periphery, and an available vacant beacon slot that is not competed with another wireless communication device is set. In the example shown in FIG. 4, the scan operation is executed only in one superframe cycle, but the present invention is not limited to such example, and the scan operation may be executed over a plurality of superframe cycles.

The network is built by transmitting the beacon from the wireless communication device on the host side in the next superframe cycle N (Superframe N). In FIG. 4, the beacon transmitting operation is carried out only in one superframe cycle, but the present invention is not limited to such example, and the beacon transmitting operation may be executed over a few superframe cycles. That is, the wireless communication device on the host side may transmit the beacon until receiving the beacon from the wireless communication device on the guest side and being reported that the presence of the host side is grasped by the guest side.

[3-1-2. Hibernation Process in Wireless Communication Device on Guest Side]

The example of the hibernation process in the wireless communication device on the host side has been described above. An example of the hibernation process in the wireless communication device on the guest side will now be described. FIG. 5 is an explanatory view for describing an example of the hibernation process in the wireless communication device on the guest side in the wireless communication system according to the present embodiment.

The operations substantially the same as the wireless communication device on the host side are carried out on the guest side, but the beacons are not transmitted in the superframe cycle N (Superframe N) and the wireless communication device on the guest side is simply synchronized with the wireless communication device on the host side. In other words, the scan operation is executed and synchronization is taken from the beacon signal of the communication device that becomes the host without transmitting beacons after the scan operation in the wireless communication device on the guest side. After the synchronization, the pause operation is performed without building the wireless network over a time defined again as the long cycle synchronization pause operation.

In the embodiment of the present invention, the wireless communication device on the guest side may be configured to once transmit the beacon when a predetermined time for checking the connection has elapsed, and notify the wireless communication device on the host side of the existence of the own device. For instance, even if the wireless communication device on the guest side is to notify the wireless communication device on the host side of the parameters indicating the state of the own device and the like, the parameters may be included in the beacon and the notification to the wireless communication device on the host side may be performed.

[3-2. Configuration of Beacon Frame]

The example of the hibernation process in the wireless communication device on the guest side has been described above. A configuration of a beacon frame exchanged between the wireless communication device on the host side and the wireless communication device on the guest side will now be described. FIG. 6A is an explanatory view showing an example of a configuration of the beacon frame.

As shown in FIG. 6A, the beacon frame is configured to include MAC header information 60, a header check sequence (HCS) 61, a beacon parameter 62, an information element (1) 63, an information element (2) 64, an information element (N) 65, and a frame check sequence (FCS) 66.

The MAC header information 60 is further configured by frame control information 601, a destination address 602 for identifying the wireless communication device of the receiving destination, a transmitting source address 603 for identifying the wireless communication device of the transmitting source, sequence control information 604 such as a sequence number, and access control information 605 described with parameters for access control. The beacon parameter 62 is further configured by a device identifier 611 described with the MAC address information and the like of the device, a beacon slot number 612 indicating the beacon slot in which the own device is performing the transmission, and device control information 613 including information unique to the device and the like.

In addition, one of more arbitrary information element is added as beacon payload information. In the example shown in FIG. 6A, the information element (1) 64, the information element (2), 65, and the information element (N) 66 are shown as information elements. Here, N indicates the number of information elements transmitted by being added to the beacon, and may take different values for every transmission beacon. The beacon frame may be configured in a form each of such information element is added or deleted, as necessary.

Figure 6B:
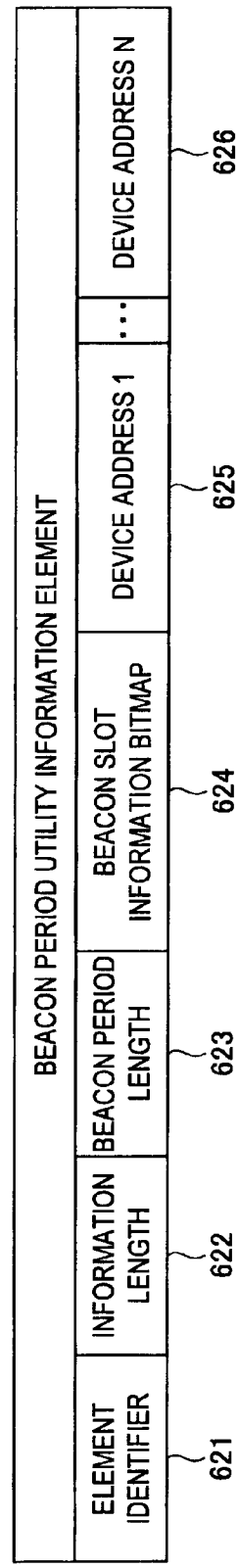
FIG. 6B is an explanatory view showing a configuration of an information element added to the beacon frame, as necessary.

FIGS. 6B, 6C, and 6D are explanatory views showing a configuration of an information element added to the beacon frame, as needed.

FIG. 6B is an explanatory view showing a configuration example of a beacon period utility information element (BPO IE). The beacon period utility information element is used to describe information on the beacon collected during the beacon period. The beacon period utility information element is configured to include a beacon period length 623 set by the own element, a beacon slot information bitmap 624 for performing notification of all beacon slots received the previous time, a device address (1) 625 which beacon is received, and a device address (2) 626, in addition to an element identifier 621 unique to the element and an information length 622.

FIG. 6C is an explanatory view showing a configuration example of a pairing information element. The pairing information element is configured to include a pairing type 633 indicating the type such as request and response of pairing, a host/guest identifier 634 for identifying whether it is operating as a host or operating as a guest, own MAC address information 635, counterpart MAC address information 636, a long cycle synchronization period set value 637 clearly showing the long cycle pause period when performing the long cycle pause operation of about a few dozen minutes to a few hours according to the embodiment of the present invention, and a pause start time information 638 showing the start timing of the long cycle pause operation in addition to an element identifier 631 unique to the element and an information length 632.

FIG. 6D is an explanatory view showing a configuration example of a communication request information element. The communication request information element is configured to include counterpart MAC address information 643 showing the paired counterpart, an upper level protocol startup necessity 644 showing whether to build a secure relationship and exchange data, and notification parameter information 645 such as notification information sent as needed, in addition to an element identifier 641 unique to the element and an information length 642.

The hibernation operation with simplified network management can be realized with low power consumption by exchanging the beacon as shown in FIGS. 6A to 6D according to a predetermined rule between the wireless communication device on the host side and the wireless communication device on the guest side. The configuration of the beacon frame exchanged between the wireless communication device on the host side and the wireless communication device on the guest side has been described above. The pause operation of the long cycle synchronization according to the embodiment of the present invention will now be described.

[3-3. Pause Operation of Long Cycle Synchronization]

Figure 7:
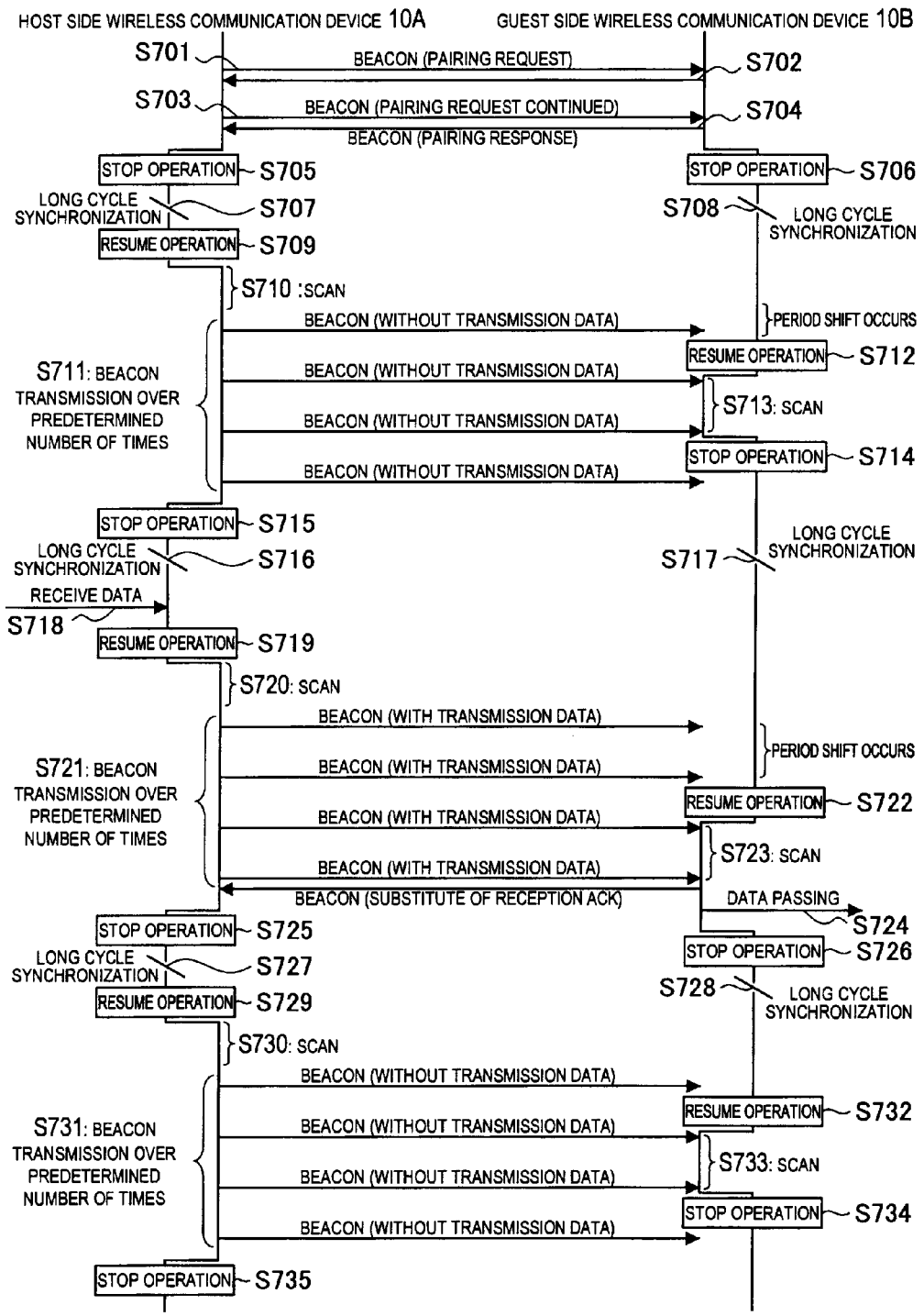
FIG. 7 is an explanatory view showing a pause operation example of the long cycle synchronization according to an embodiment of the present invention.

FIG. 7 is an explanatory view showing a pause operation example of a long cycle synchronization according to the embodiment of the present invention. The pause operation of the long cycle synchronization according to the embodiment of the present invention will be described below using FIG. 7. In FIG. 7, a case in which the host side wireless communication device is a wireless communication device 10A and another wireless communication device 10B is the guest side wireless communication device is shown, and a configuration of performing the pause operation of the long cycle synchronization according to the embodiment of the present invention when communication demand has not occurred is shown. The following description is made with the wireless communication device 10A as the host side wireless communication device 10A and the wireless communication device 10B as the guest side wireless communication device 10B.

First, assume a case in which the host side wireless communication device 10A and the guest side wireless communication device 10B exchange beacons in advance to grasp the existence of each other. In such a case, for example, a beacon containing the information element of a pairing request for the guest side wireless communication device 10B is transmitted in a certain superframe period from the host side communication device 10A (step S701). The guest side wireless communication device 10B transmits a beacon towards the host side wireless communication device 10A without containing the information element related to pairing if the information element of the pairing request from the host side wireless communication device 10A is not recognized (step S702).

In the next superframe cycle as well, the host side wireless communication device 10A transmits a beacon containing the information element of the pairing request over a predetermined period until receiving a response from the guest side wireless communication device 10B (step S703). In the guest side wireless communication device 10B, the request from the host side wireless communication device 10A is judged before the next superframe cycle if the information element of the pairing request from the host side wireless communication device 10A is recognized. If the own device can operate as the guest as a result of judging the request from the host side wireless communication device 10A, the guest side wireless communication device 10B transmits a beacon containing the information element of a pairing response to the host side wireless communication device 10A (step S704).

After the pairing information is exchanged between the host side wireless communication device 10A and the guest side wireless communication device 10B, the host side wireless communication device 10A and the guest side wireless communication device 10B stop the operation (steps S705, S706). The host side wireless communication device 10A and the guest side wireless communication device 10B then enter the pause operation by the long cycle synchronization defined in advance (steps S707, S708).

In the host side wireless communication device 10A, the operation is resumed after the long cycle synchronization pause period has elapsed (step S709), a predetermined scan operation is performed, and the own beacon slot is determined according to the other wireless communication device existing at the periphery (step S710). After determining the own beacon slot, the host side wireless communication device 10A performs transmission of the beacon to the guest side wireless communication device 10B over a predetermined number of times (step S711). Here, the information element for starting the guest side wireless communication device 10B is not added in the host side wireless communication device 10A if communication is not made to the guest side wireless communication device 10B.

In the guest side wireless communication device 10B as well, the operation is resumed after the long cycle synchronization pause period has elapsed (step S712), and the scan operation for searching the beacon signal from the host side wireless communication device 10A is performed (step S713). Here, a slight period shift may occur in the elapsed time of the long cycle synchronization pause period by the difference in internal clocks of the host side wireless communication device 10A and the guest side wireless communication device 10B. In this case, the host side wireless communication device 10A performs the beacon transmission over a predetermined number of times, and grasps the number of transmissions of the beacon the guest side wireless communication device 10B received. The host side wireless communication device 10A and the guest side wireless communication device 10B can be synchronized and the period shift can be corrected by grasping the number of beacons the guest side wireless communication device 10B received.

If the communication request from the host side wireless communication device 10A is not described, the guest side wireless communication device 10B stops the operation without starting itself up (step S714), and again enters the pause operation of the long cycle synchronization pause period (step S717). Furthermore, the host side wireless communication device 10A also stops the operation after the beacon transmission of a predetermined number of times is finished (step S715), and again enters the pause operation of the long cycle synchronization pause period (step S716).

If the data to transmit to the guest side wireless communication device 10B is accepted by the host side wireless communication device 10A during the long cycle synchronization pause period (step S718), the operation is resumed after the long cycle synchronization pause period has elapsed (step S719). When the operation is resumed in step S719, the host side wireless communication device 10A performs a predetermined scan operation (step S720). The host side wireless communication device 10A performs the scan operation and determines the own beacon slot according to other wireless communication device existing at the periphery, and then transmits the beacon over a predetermined number of times towards the guest side wireless communication device 10B (step S721). Here, the beacon added with the information element for starting up the guest is transmitted to the guest side wireless communication device 10B. The transmission data in this case may be sent by being incorporated in the beacon for short data, or the data may be exchanged after both wireless communication devices are in the operating state and the connection by the upper level protocol is recovered for long data.

In the guest side wireless communication device 10B as well, the operation is resumed after the long cycle synchronization pause period is resumed (step S722), and the scan operation for searching the beacon signal of the host side wireless communication device 10A is performed (step S723). A slight period shift may occur in the elapsed time of the long cycle synchronization pause period by the difference in the internal clocks of the host side wireless communication device 10A and the guest side wireless communication device 10B. In this case, the host side wireless communication device 10A performs the beacon transmission over a predetermined number of times, and grasps the number of transmissions of the beacon the guest side wireless communication device 10B received. The host side wireless communication device 10A and the guest side wireless communication device 10B can be synchronized and the period shift can be corrected by grasping the number of beacons the guest side wireless communication device 10B received.

If the communication request from the host side wireless communication device 10A is described in the beacon received by the guest side wireless communication device 10B, the guest side wireless communication device 10B determines the own beacon slot according to the existence of the other peripheral wireless communication device from the result of the scan operation. After determining the own beacon slot, the beacon is transmitted to the host side wireless communication device 10A using such beacon slot. Furthermore, also when the guest side wireless communication device 10B notifies the host side wireless communication device 10A of predetermined status information, the beacon slot is similarly determined and the parameter thereof is reported by being described in the beacon to transmit.

The guest side wireless communication device 10B passes the data transmitted from the host side wireless communication device 10A to the layer of upper level after exchange of data is completed (step S724), and again stops the operation (step S726). The guest side wireless communication device 10B enters the pause operation of the long cycle synchronization pause period (step S728). The host side wireless communication device 10A also confirms that the counterpart received the own beacon with the beacon from the guest side wireless communication device 10B, so that both wireless communication devices can be recognized as being in the operating state and judgment that the reception of data sent by being incorporated in the beacon is confirmed is made. The transmitting operation is stopped after the exchange of data is finished or after the beacon transmission of a predetermined number of times is finished (step S725). The host side wireless communication device 10A that stopped the transmitting operation again enters the pause operation of the long cycle synchronization pause period (step S727).

Thereafter, in the host side wireless communication device 10A, the operation is resumed after the long cycle synchronization pause period has elapsed (step S729), a predetermined scan operation is performed, and the own beacon slot is determined according to the other wireless communication device existing at the periphery (step S730). The host side wireless communication device 10A that determined the beacon slot performs transmission of the beacon over a predetermined number of times (step S731). Since the data to transmit to the guest side wireless communication device 10B does not exist, the information element to start up the guest side wireless communication device 10B is not added to the beacon.

In the guest side wireless communication device 10B as well, the operation is resumed after the long cycle synchronization pause period has elapsed (step S732), and the scan operation for searching the beacon signal from the host side wireless communication device 10A is performed (step S733). Here, a slight period shift may occur in the elapsed time of the long cycle synchronization pause period by the difference in internal clocks of the host side wireless communication device 10A and the guest side wireless communication device 10B. In this case, the host side wireless communication device 10A performs the beacon transmission over a predetermined number of times, and grasps the number of transmissions of the beacon the guest side wireless communication device 10B received. The host side wireless communication device 10A and the guest side wireless communication device 10B can be synchronized and the period shift can be corrected by grasping the number of beacons the guest side wireless communication device 10B received.

Since the communication from the host side wireless communication device 10A is not made, the guest side wireless communication device 10B stops the operation without starting up (step S734), and again enters the pause operation of the long cycle synchronization pause period. Furthermore, the host side wireless communication device 10A also stops the operation after the beacon transmission of a predetermined number of times is finished (step S735), and again enters the pause operation of the long cycle synchronization pause period.

The exchange of unnecessary beacon signal is omitted between the host side wireless communication device 10A and the guest side wireless communication device 10B by repeating the above-mentioned operations, and the power consumption is reduced by repeating the above operations.

The pause operation of the long cycle synchronization according to the embodiment of the present invention has been described above. The configuration of the host side wireless communication device 10A according to the embodiment of the present invention will now be described.

[3-4. Configuration of Host Side Wireless Communication Device]

Figure 8:
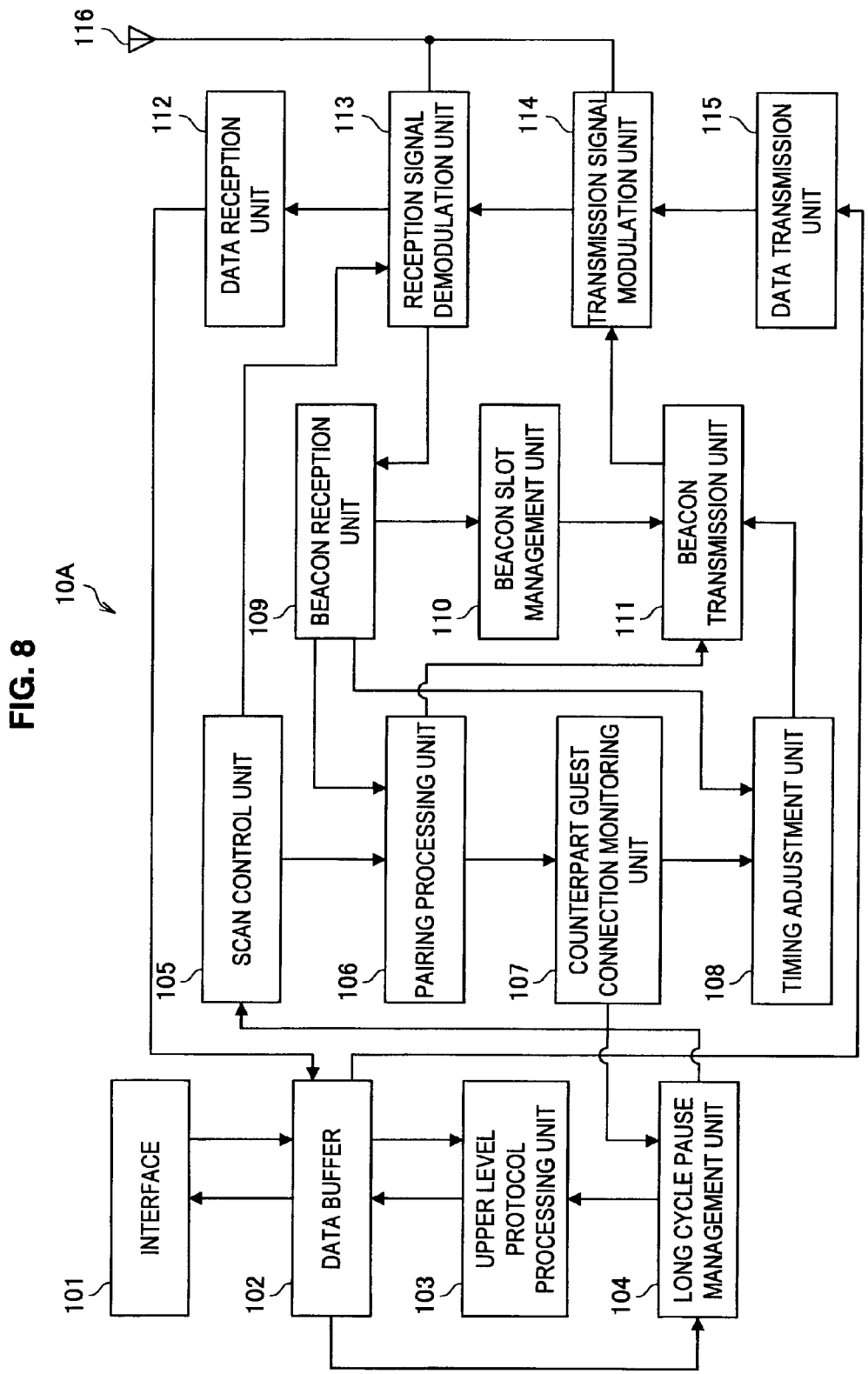
FIG. 8 is an explanatory view for describing a configuration of a host side wireless communication device 10A according to the embodiment of the present invention.

FIG. 8 is an explanatory view for describing a configuration of the host side wireless communication device 10A according to the embodiment of the present invention. The configuration of the host side wireless communication device 10A according to the embodiment of the present invention will be described below using FIG. 8.

As shown in FIG. 8, the host side wireless communication device 10A according to the embodiment of the present invention is configured to include an interface 101, a data buffer 102, an upper level protocol processing unit 103, a long cycle pause management unit 104, a scan control unit 105, a pairing processing unit 106, a counterpart guest connection monitoring unit 107, a timing adjustment unit 108, a beacon reception unit 109, a beacon slot management unit 110, a beacon transmission unit 111, a data reception unit 112, a reception signal demodulation unit 113, a transmission signal modulation unit 114, a data transmission unit 115, and an antenna 116.

The interface 101 exchanges data such as application data with an application device connected to the host side wireless communication device 10A. The data buffer 102 temporarily stores the data.

The upper level protocol processing unit 103 ensures a predetermined connection and ensures a secure communication path. The upper level protocol refers to the protocol at the upper level of the beacon exchange protocol for exchanging beacons, and may be a connection method of the wireless USB system or a connection method of the Bluetooth (trademark) system.

The long cycle pause management unit 104 manages a series of operations related to the pause operation of a long cycle in the host side wireless communication device 10A according to the present embodiment. In the long cycle pause management unit 104, a counter during the pause operation of the long cycle is counted by a low-speed clock, and the pause operation over a long cycle is performed as a low power consumption operation.

The scan control unit 105 executes the scan operation to set the beacon slot to use at the start of the pairing operation or when started after the pause operation of a long cycle is terminated.

The pairing processing unit 106 executes the pairing process with the guest side wireless communication device 10B. The details on the pairing process of the host side wireless communication device 10A and the guest side wireless communication device 10B will be described later.

The counterpart guest connection monitoring unit 107 monitors the connection with respect to the guest side wireless communication device 10B over a long time. For instance, the host side wireless communication device 10A can resolve the pair with the guest side wireless communication device 10B by monitoring the existence of the guest side wireless communication device 10B, in which transmission of the beacon is not made for a long period after becoming a pair, with the counterpart guest connection monitoring unit 107.

The timing adjustment unit 108 adjusts the timing of the beacon it transmits from the received beacon when the host side wireless communication device 10A receives the beacon from the guest side wireless communication device 10B and other wireless communication devices.

The beacon reception unit 109 analyzes the content of the received beacon when the host side wireless communication device 10A receives the beacon from the guest side wireless communication device 10B and other wireless communication devices.

The beacon slot management unit 110 determines the unused beacon slot from the beacon received from the guest side wireless communication device 10B and other wireless communication devices, and sets the own beacon slot.

The beacon transmission unit 111 transmits the beacon in the own beacon slot set by the beacon slot management unit 110. The beacon reception unit 109 and the beacon transmission unit 111 are examples of a beacon exchanging unit of the embodiment of the present invention.

The data reception unit 112 analyzes the data contained in the high frequency signal collected by the antenna 116. The reception signal demodulation unit 113 executes the receiving operation at the time of performing the scan operation. The transmission signal modulation unit 114 modulates the beacon, the data, and the like through a predetermined modulation at the time of transmitting the beacon, the data, and the like to execute the transmitting operation.

The data transmission unit 115 executes building of the data transmitted from the host side wireless communication device 10A. The antenna 116 collects or transmits the high frequency signal. The data built by the data transmission unit 115 is sent out from the antenna 116 as a high frequency signal.

The configuration of the host side wireless communication device 10A according to the embodiment of the present invention has been described. The configuration of the guest side wireless communication device 10B according to the embodiment of the present invention will now be described.

[3-5. Configuration of Guest Side Wireless Communication Device]

Figure 9:
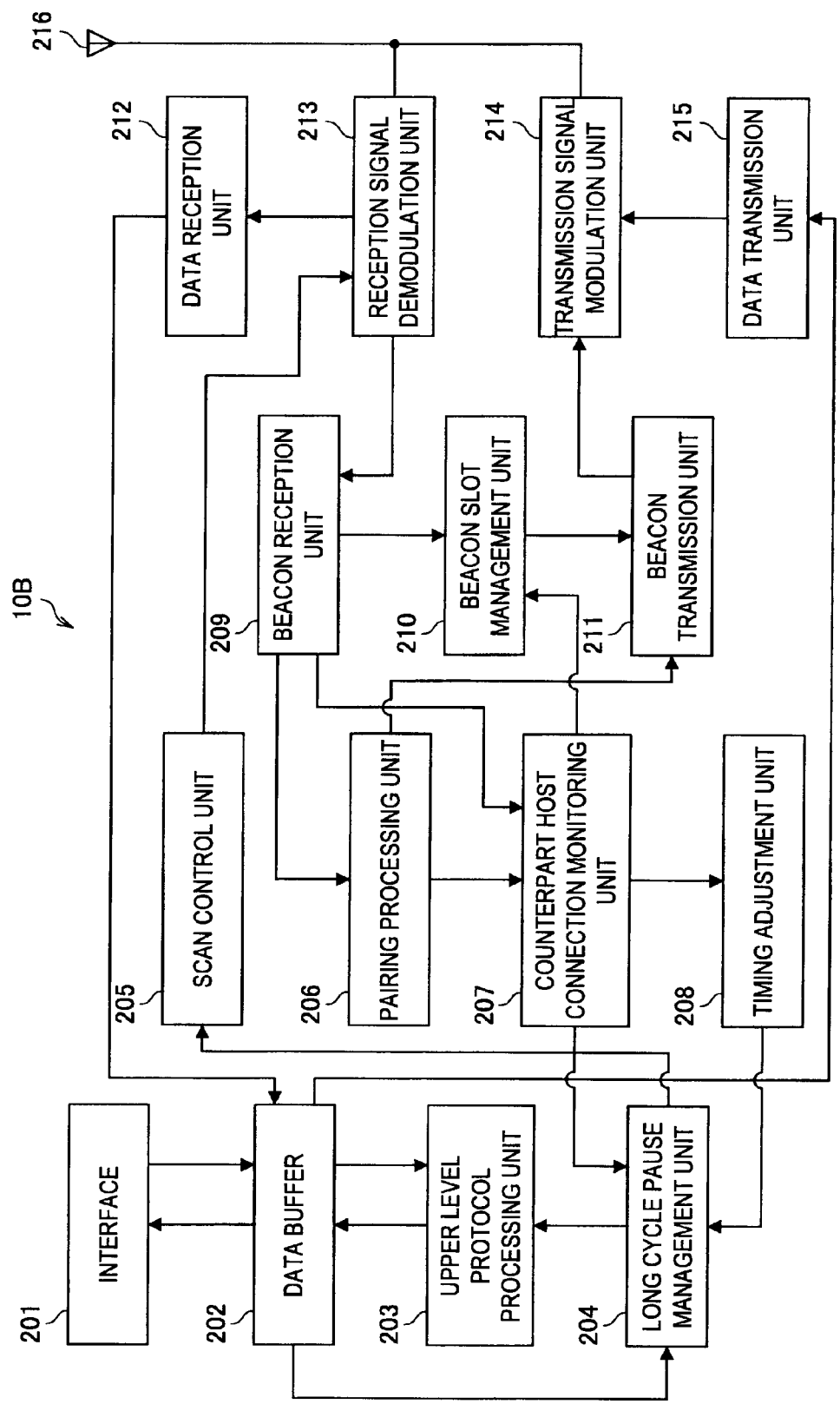
FIG. 9 is an explanatory view for describing a configuration of a guest side wireless communication device 10B according to the embodiment of the present invention.

FIG. 9 is an explanatory view for describing a configuration of the guest side wireless communication device 10B according to the embodiment of the present invention. The configuration of the guest side wireless communication device 10B according to the embodiment of the present invention will be described below using FIG. 9.

As shown in FIG. 9, the guest side wireless communication device 10B according to the embodiment of the present invention is configured to include an interface 201, a data buffer 202, an upper level protocol processing unit 203, a long cycle pause management unit 204, a scan control unit 205, a pairing processing unit 206, a counterpart host connection monitoring unit 207, a timing adjustment unit 208, a beacon reception unit 209, a beacon slot management unit 210, a beacon transmission unit 211, a data reception unit 212, a reception signal demodulation unit 213, a transmission signal modulation unit 214, a data transmission unit 215, and an antenna 216.

The interface 201 exchanges data such as application data with an application device connected to the guest side wireless communication device 10B. The data buffer 202 temporarily stores the data.

The upper level protocol processing unit 203 ensures a predetermined connection and ensures a secure communication path. The upper level protocol refers to the protocol at the upper level of the beacon exchange protocol for exchanging beacons, and may be a connection method of the wireless USB system or a connection method of the Bluetooth (trademark) system.

The long cycle pause management unit 204 manages a series of operations related to the pause operation of a long cycle in the guest side wireless communication device 10B according to the present embodiment. In the long cycle pause management unit 204, a counter during the pause operation of the long cycle is counted by a low-speed clock, and the pause operation over a long cycle is performed as a low power consumption operation.

The scan control unit 205 executes the scan operation to set the beacon slot to use at the start of the pairing operation or when started after the pause operation of a long cycle is terminated.

The pairing processing unit 206 executes the pairing process with the host side wireless communication device 10A. The details on the pairing process of the host side wireless communication device 10A and the guest side wireless communication device 10B will be described later.

The counterpart host connection monitoring unit 207 monitors the connection with respect to the host side wireless communication device 10A over a long time. For instance, the guest side wireless communication device 10B can resolve the pair with the host side wireless communication device 10A by monitoring the existence of the host side wireless communication device 10A, in which transmission of the beacon is not made for a long period after becoming a pair, with the counterpart host connection monitoring unit 207.

The timing adjustment unit 208 adjusts the timing of the beacon it transmits from the received beacon when the guest side wireless communication device 10B receives the beacon from the host side wireless communication device 10A and other wireless communication devices.

The beacon reception unit 209 analyzes the content of the received beacon when the guest side wireless communication device 10B receives the beacon from the host side wireless communication device 10A and other wireless communication devices.

The beacon slot management unit 210 determines the unused beacon slot from the beacon the guest side wireless communication device 10B received from the host side wireless communication device 10A and other wireless communication devices, and sets the own beacon slot.

The beacon transmission unit 211 transmits the beacon in the own beacon slot set by the beacon slot management unit 210. The beacon reception unit 209 and the beacon transmission unit 211 are examples of a beacon exchanging unit of the embodiment of the present invention.

The data reception unit 212 analyzes the data contained in the high frequency signal collected by the antenna 216. The reception signal demodulation unit 213 executes the receiving operation at the time of performing the scan operation. The transmission signal modulation unit 214 modulates the beacon, the data, and the like through a predetermined modulation at the time of transmitting the beacon, the data, and the like to execute the transmitting operation.

The data transmission unit 215 executes building of the data transmitted from the guest side wireless communication device 10B. The antenna 216 collects or transmits the high frequency signal. The data built by the data transmission unit 215 is sent out from the antenna 216 as a high frequency signal.

The configuration of the guest side wireless communication device 10B according to the embodiment of the present invention has been described. The pairing operation between the host side wireless communication device 10A and the guest side wireless communication device 10B according to the embodiment of the present invention will now be described.

[3-6. Pairing Operation]

Figure 10:
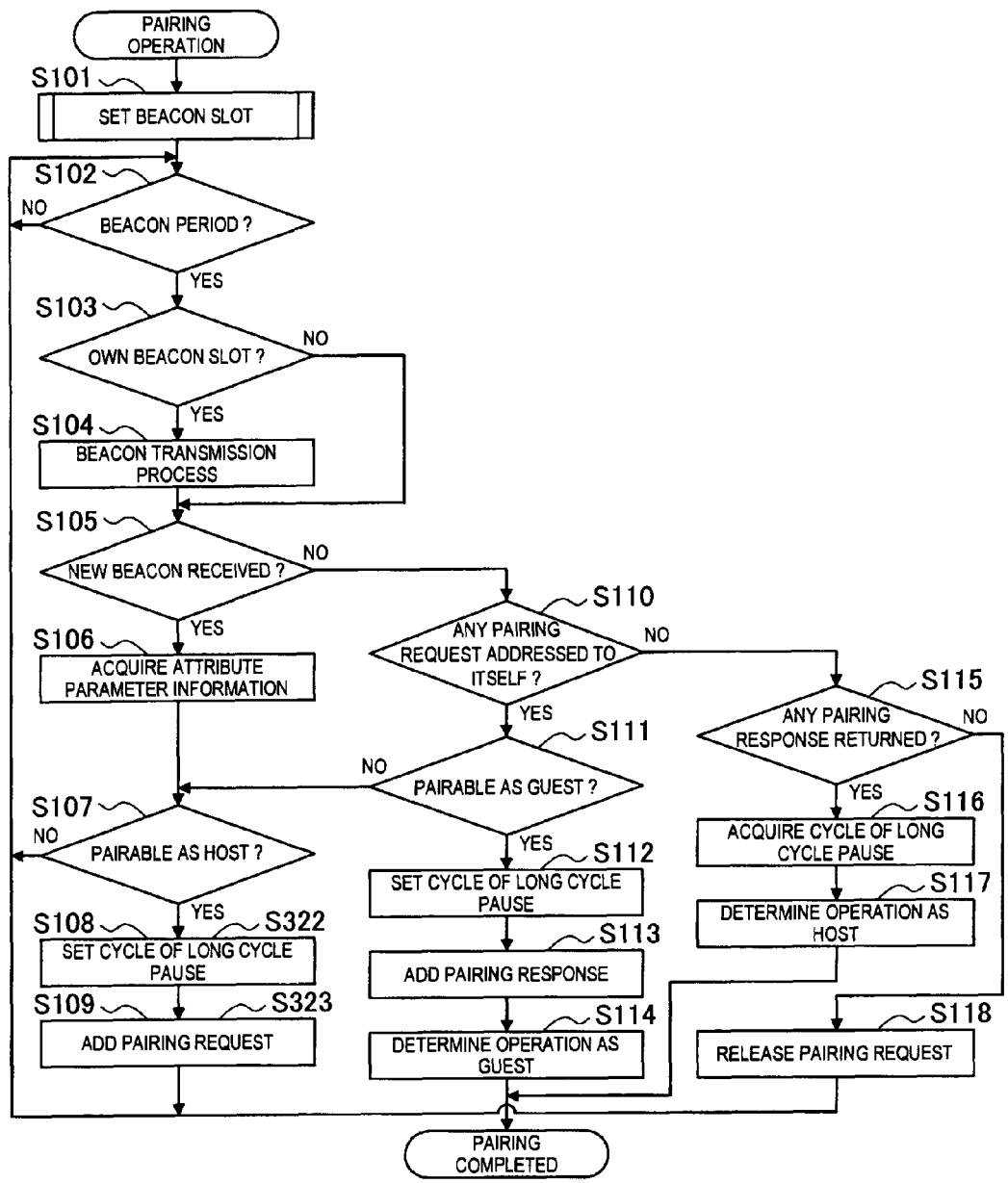
FIG. 10 is a flowchart for describing the pairing operation between the host side wireless communication device 10A and the guest side wireless communication device 10B according to the embodiment of the present invention.

FIG. 10 is a flowchart for describing the pairing operation between the host side wireless communication device 10A and the guest side wireless communication device 10B according to the embodiment of the present invention. The pairing operation between the host side wireless communication device 10A and the guest side wireless communication device 10B according to the embodiment of the present invention will be described using FIG. 10.

First, the host side wireless communication device 10A or the guest side wireless communication device 10B performs the setting of the own beacon slot according to a predetermined procedure (step S101). The setting of the own beacon slot is executed by the beacon slot management unit 110, 210. For instance, a predetermined scan operation may be performed, and the own beacon slot may be set by the beacon slot management unit 110, 210 according to other wireless communication device existing at the periphery. The process of setting the beacon slot will be described later.

After setting the own beacon slot, the host side wireless communication device 10A or the guest side wireless communication device 10B determines whether it is currently the beacon period in the superframe by the beacon slot management unit 110, 210 (step S102). If it is currently not the beacon period as a result of the determination in step S102, the beacon period is waited. If it is the beacon period as a result of the determination in step S102, whether or not it is the own beacon slot is determined by the beacon slot management unit 110, 210 (step S103).

If determined as the own beacon slot as a result of the determination in step S103, the wireless communication device transmits the beacon from the beacon transmission unit 111, 211 (step S104). In the beacon slot other than the own beacon slot, the beacon reception process from another wireless communication device is executed by the beacon reception unit 109, 209. Whether or not a new beacon slot is received in the beacon slot other than the own slot is determined by the beacon reception unit 109, 209 (step S105).

If determined by the beacon reception unit 109, 209 that the new beacon is received as a result of the determination in step S105, the content of the beacon is analyzed by the beacon reception unit 109, 209. As a result of the analysis, attribute parameter information including various information such as a device identifier 611 contained in the beacon frame is analyzed (step S106). Whether it can be paired as the host side wireless communication device with respect to the counterpart as a result of analyzing the attribute parameter information is determined by the pairing processing unit 106, 206 (step S107).

If determined by the pairing processing unit 106, 206 that it can be paired as a host with respect to the counterpart as a result of the determination in step S107, the pairing processing unit 106, 206 sets the cycle of the long cycle pause (step S108). The pairing processing unit 106, 206 then adds the pairing information element for pairing request to the beacon to be transmitted from the beacon transmission unit 111, 211 (step S109). In the pairing information element for pairing request added to the beacon in step S109, the information on the cycle of the long cycle pause set in step S108 is set to the long cycle synchronization period set value 637. After the pairing information element for pairing request is added to the beacon to be transmitted from the beacon transmission unit 111, 211, the process returns to step S102, and the beacon transmission unit 111, 211 transmits the relevant beacon in the own beacon slot during the beacon period.

If determined by the beacon reception unit 109, 209 that the received beacon is not the new beacon as a result of the determination in step S105, the beacon received by the beacon reception unit 109, 209 is analyzed. Whether or not the pairing information element for pairing request addressed to itself is contained in the beacon as a result of the analysis is determined (step S110). Whether or not the pairing request addressed to itself is contained may be determined by analyzing whether information for pairing addressed to itself is contained in the pairing information element shown in FIG. 6C. In other words, the information for pairing addressed to itself may be determined as being contained if the own MAC address is described in the counterpart MAC address 636 and the information requesting for pairing is described in the pairing type 633.

If determined that the pairing information element for pairing request addressed to itself is contained in the beacon as a result of the determination in step S110, whether or not it can be paired as the guest side wireless communication device with respect to the counterpart transmitting the beacon containing the pairing request is subsequently determined by the pairing processing unit 106, 206 (step S111). If determined that it can be paired as the guest side wireless communication device as a result of the determination in step S111, the cycle of the long cycle pause is set in the pairing processing unit 106, 206 (step S112). The pairing processing unit 106, 206 adds the information element of pairing response to the beacon transmitted from the beacon transmission unit 111, 211 (step S113), and thereafter, determined as the operation for the guest side wireless communication unit (step S114). Whether it operates as the host side wireless communication device or operates as the guest side wireless communication device may be defined in advance in the respective wireless communication devices, or may be determined for every pairing process depending on the manner of pairing the wireless communication devices.

If determined that the pairing request addressed to itself is not contained in the beacon as a result of the determination in step S110, whether or not the pairing response is received from the guest side wireless communication device is subsequently determined by the beacon reception unit 109, 209 (step S115).

If determined that the pairing response from the guest side wireless communication device is received as a result of the determination in step S115, the beacon reception unit 109, 209 acquires the cycle of the long cycle pause of the pairing counterpart contained in the beacon transmitted by the guest side wireless communication device (step S116). The cycle of the long cycle pause of the pairing counterpart is described in the long cycle synchronization period set value 637. Thereafter, the operation for the host side wireless communication device is determined (step S117), and the pairing process is completed. If determined that the pairing response is not received even after a predetermined time has elapsed from the wireless communication device that acts as the guest as a result of the determination in step S115, the pairing processing unit 106, 206 cancels the pairing request (step S118) and does not perform the long cycle pause operation.

The series of operations shown in FIG. 10 are terminated when the operation for the host side wireless communication device or the operation for the guest side wireless communication device is determined, but if not determined, the process returns to step S102 and the series of processes are repeated. Therefore, the wireless communication device according to the present embodiment realizes the operation according to the present embodiment when the pairing is completed while maintaining compatibility with the existing system.

The pairing operation between the host side wireless communication device 10A and the guest side wireless communication device 10B according to the embodiment of the present invention has been described above. The operation of the wireless communication device 10A according to the embodiment of the present invention will now be described.

[3-7. Operation of Host Side Wireless Communication Device]

Figure 11:
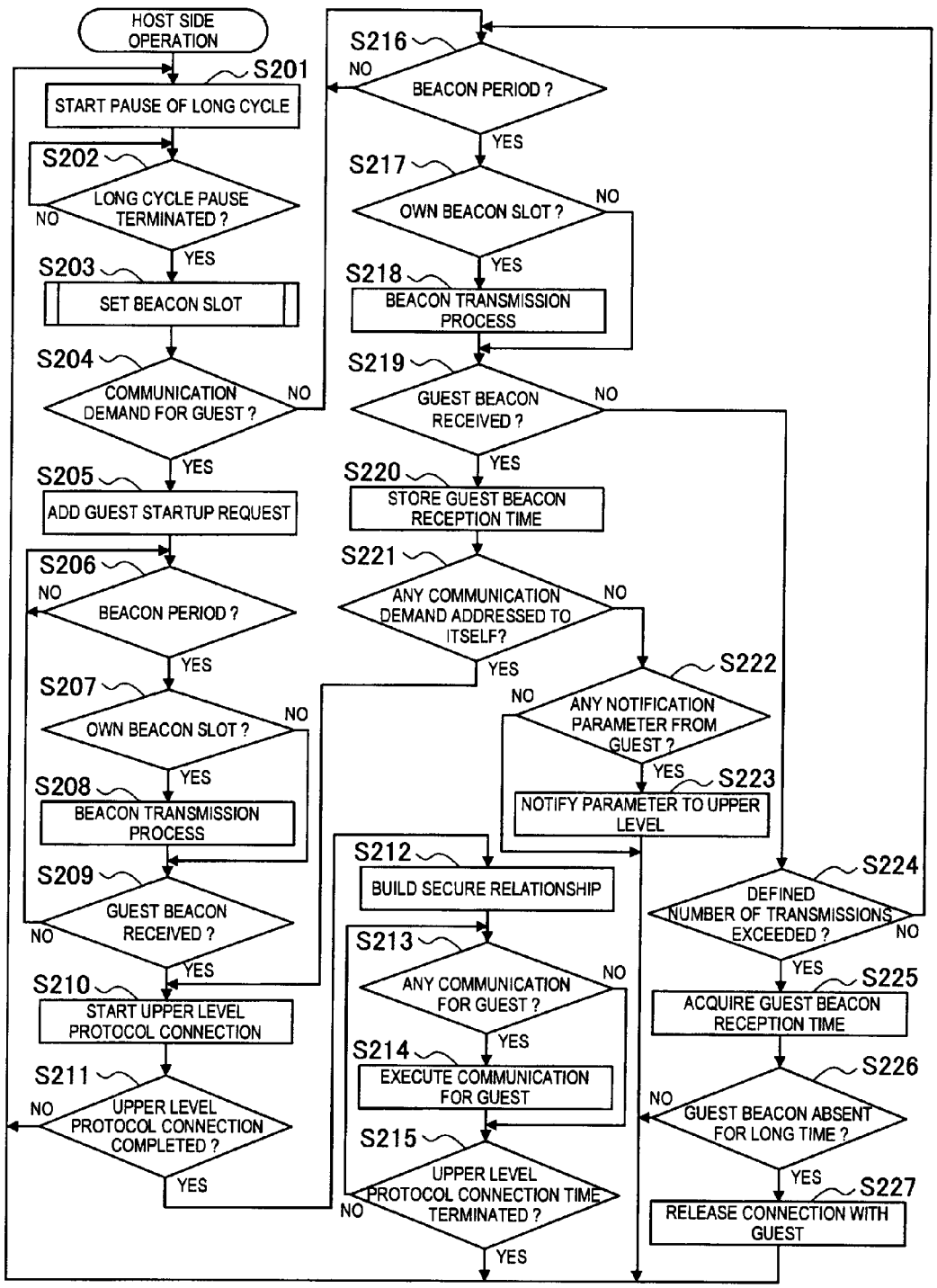
FIG. 11 is a flowchart for describing the operation of the host side wireless communication device 10A according to the embodiment of the present invention.

FIG. 11 is a flowchart for describing the operation of the host side wireless communication device 10A according to the embodiment of the present invention. The operation of the host side wireless communication device 10A according to the embodiment of the present invention will now be described using FIG. 11.

Here, assume that the long cycle pause operation is confirmed in the pairing process shown in FIG. 10. When a predetermined time has elapsed, the pause operation starts in the host side wireless communication device 10A (step S201). The predetermined time may be described in the pause start time information 638 contained in the pairing information element shown in FIG. 6C. The period of executing the pause operation may be described in the long cycle synchronization period set value 637 contained in the pairing information element shown in FIG. 6C.

Subsequently, whether or not the long cycle pause operation is terminated is determined by the long cycle pause management unit 104 (step S202). If determined that the long cycle pause operation is terminated by the long cycle pause management unit 104, the host side wireless communication device 10A sets the own beacon slot according to a predetermined procedure (step S203), and sets the slot to use every time. In the present embodiment, the counter during the pause operation is counted by a low-speed clock in the long cycle pause management unit 104, so that the pause operation over a long cycle is performed as a low power consumption operation in the host side wireless communication device 10A.

Whether a communication demand from the host side wireless communication device 10A to the guest side wireless communication device 10B is made is determined (step S204). The determination on the presence of the communication demand may be made by the long cycle pause management unit 104. If the communication demand to the guest side wireless communication device 10B is made, the startup request with respect to the guest side wireless communication device 10B is added to the information transmitted from the host side wireless communication device 10A (step S205). If the information to transmit to the guest side wireless communication device 10B is short data or command, the information may be transmitted by being directly embedded in the beacon. The communication request information element as shown in FIG. 6D may be used to directly embed the information to the beacon.

If the communication demand from the host side wireless communication device 10A to the guest side wireless communication device 10B is made, the host side wireless communication device 10A waits until it becomes the beacon period (step S206). When it becomes the beacon period and the own beacon slot arrives (step S207), the host side wireless communication device 10A transmits the beacon from the beacon transmission unit 111 (step S208).

If the beacon from the guest side wireless communication device 10B added with the startup request is received by the beacon reception unit 109 through the antenna 116 (step S209), the connection by the upper level protocol is started (step S210). The connection by the upper level protocol is performed by the control of the upper level protocol processing unit 103. The upper level protocol here refers to the protocol of upper level than the beacon exchange protocol, and for example, data transmission and reception is performed at the layer of upper level than the MAC layer when the transmission and reception process of the beacon in the MAC layer is completed. The upper level protocol may be a connection method of the wireless USB system or a connection method of the Bluetooth (trademark) system.

After the predetermined connection is completed at the upper level protocol (step S211), a secure relationship is built by the upper layer protocol processing unit 103 between the host side wireless communication device 10A and the guest side wireless communication device 10B (step S212). If the communication from the host side wireless communication device 10A to the guest side wireless communication device 10B is made (step S213), the communication to the guest side wireless communication device 10B is performed (step S214). Furthermore, the host side wireless communication device 10A again returns to step S201 if determined by the long cycle pause management unit 104 that the connection time defined in the upper level protocol has elapsed (step S215). The host side wireless communication device 10A then repeats the long cycle pause operation.

Even when the communication demand from the host side wireless communication device 10A to the guest side wireless communication device 10B is not made as a result of the determination in step S204, the host side wireless communication device 10A executes the beacon transmission process with the beacon transmission unit 111 (step S218) when the own beacon slot arrives (step S217) in the beacon period (step S216).

The host side wireless communication device 10A determines whether or not the beacon from the guest side wireless communication device 10B is received (step S219). If the beacon from the guest side wireless communication device 10B is received, the reception time of the beacon is recorded by the beacon reception unit 109 (step S220). If the communication demand addressed to itself from the guest side wireless communication device 10B is made (step S221), the process proceeds to step S210, and the communication by the upper level protocol is performed.

Even when the communication demand addressed to itself from the guest side wireless communication device 10B is not made in step S221, whether or not the notification parameter from the guest side wireless communication device 10B is described in the received beacon is determined (step S222). If the notification parameter from the guest side wireless communication device 10B is described in the received beacon, the notification of the parameter to the upper level interface 101 is performed (step S223).

If determined that the beacon from the guest side wireless communication device 10B is not received in step S219, the host side wireless communication device 10A determines whether the own beacon is transmitted for a defined number of times (step S224). If the own beacon is transmitted for a defined number of times, the host side wireless communication device 10A acquires the reception time information of receiving the most recent beacon from the guest side wireless communication device 10B with the counterpart guest connection monitoring unit 107 (step S225). If the beacon from the guest side wireless communication device 10B is not received for a long time (e.g., one day) (step S226), the pairing processing unit 106 cancels the connection with the guest side wireless communication device 10B and cancels pairing (step S227).

The series of operations described above are such that the host side wireless communication device 10A maintains the operation of the host by returning the process to step S201 and repeating the long cycle pause operation for a predetermined period.

The operation of the host side wireless communication device 10A according to the embodiment of the present invention has been described above. The operation of the guest side wireless communication device 10B according to the embodiment of the present invention will now be described.

[3-8. Operation of Guest Side Wireless Communication Device]

Figure 12:
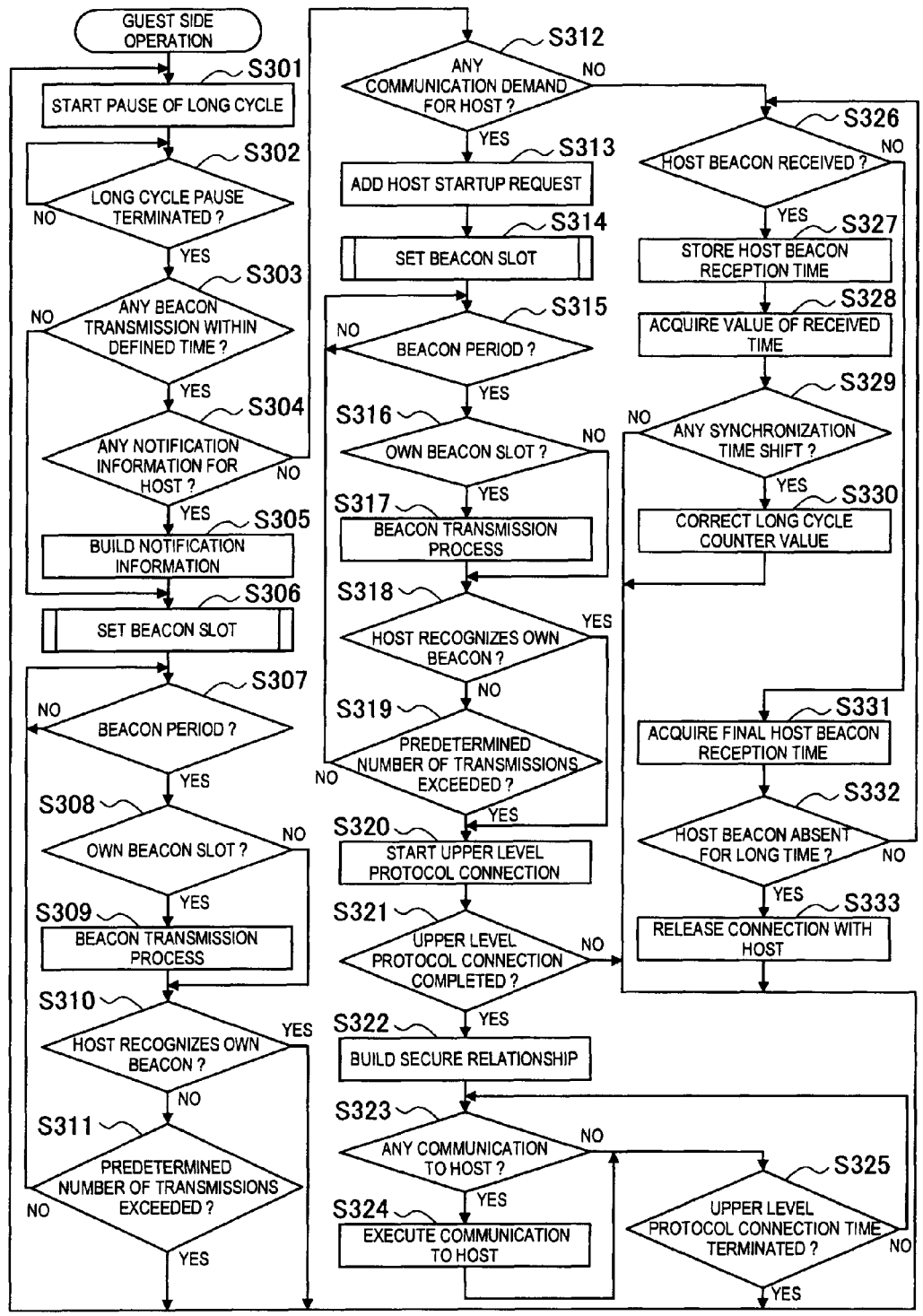
FIG. 12 is a flowchart for describing the operation of the guest side wireless communication device 10B according to the embodiment of the present invention.

FIG. 12 is a flowchart for describing the operation of the guest side wireless communication device 10B according to the embodiment of the present invention. The operation of the guest side wireless communication device 10B according to the embodiment of the present invention will be described below using FIG. 12.

Here, assume that the long cycle pause operation is confirmed in the pairing process shown in FIG. 10. When a predetermined time has elapsed, the pause operation starts in the guest side wireless communication device 10B (step S301). The predetermined time may be described in the pause start time information 638 contained in the pairing information element shown in FIG. 6C. The period of executing the pause operation may be described in the long cycle synchronization period set value 637 contained in the pairing information element shown in FIG. 6C.

Subsequently, whether or not the long cycle pause operation is terminated is determined by the long cycle pause management unit 204 (step S302). If the long cycle pause operation is terminated, whether the transmission of the own beacon is present within a defined time by, for example, the long cycle pause management unit 204 (step S303). If the transmission of the own beacon is present within the defined time, whether or not notification information addressed to the host side wireless communication device 10A is present is determined by the long cycle pause management unit 204 (step S304). If the notification information addressed to the host side wireless communication device 10A is present, the notification information such as the parameter thereof is appropriately built in the data transmission unit 215 (step S305). The setting of the own beacon slot is performed by the beacon slot management unit 210 with the building of the notification information such as the parameter (step S306). If the information to transmit to the host side wireless communication device 10A is short data or command, the information may be transmitted by being directly embedded in the beacon. The communication request information element as shown in FIG. 6D may be used to directly embed the information to the beacon. Even if determined that the transmission of the own beacon is not present within the defined time in step S303, the setting of the own beacon slot is performed by the beacon slot management unit 210 according to a predetermined procedure (step S306), and the slot it uses is set each time. The process of setting the beacon slot will be specifically described later.

When it becomes the beacon period (step S307) and the own beacon slot arrives (step S308), the guest side wireless communication device 10B transmits the beacon from the beacon transmission unit 211 (step S309). If the host side wireless communication device 10A does not recognize the beacon of the guest side wireless communication device 10B (step S310), the guest side wireless communication device 10B returns to step S307 (step S311) until exceeding a predetermined number of transmissions, and repeats the transmission of the beacon. After the host side wireless communication device 10A recognizes the beacon of the guest side wireless communication device 10B, the guest side wireless communication device 10B stops the transmission of the beacon and returns to step S301 to carry out again the long cycle pause operation.

If the notification information addressed to the host side wireless communication device 10A from the guest side wireless communication device 10B is not present in step S304, whether or not the communication demand from the guest side wireless communication device 10B to the host side wireless communication device 10A is present is determined (step S312). If the communication demand from the guest side wireless communication device 10B to the host side wireless communication device 10A is present, the startup request is added by the guest side wireless communication device 10B (step S313). The data on the startup request of the host side wireless communication device 10A may be embedded in the beacon to be transmitted from the guest side wireless communication device 10B. The guest side wireless communication device 10B sets the own beacon slot according to a predetermined procedure described later (step S314). The competition of the slot with the peripheral wireless communication devices can be avoided by setting the slot it uses for every communication.

After the beacon slot is set in step S314, the guest side wireless communication device 10B enters the beacon period (step S315), and transmits the beacon from the beacon transmission unit 211 (step S317) when the own beacon slot arrives (step S316). When the host side wireless communication device 10A recognizes the beacon of the guest side wireless communication device 10B (step S318), the connection by the upper level protocol starts (step S320). Whether the host side wireless communication device 10A recognized the beacon of the guest side wireless communication device 10B may be determined based on whether the transmission of the beacon containing a response is made from the host side wireless communication device 10A to the guest side wireless communication device 10B. If the host side wireless communication device 10A does not recognize the beacon of the guest side wireless communication device 10B, the guest side wireless communication device 10B returns to step S315 until exceeding a predetermined number of transmissions (step S319). The guest side wireless communication device 10B then repeats the transmission of the beacon by the beacon transmission unit 211.

After a predetermined connection is completed by the upper level protocol (step S321), the guest side wireless communication device 10B builds a secure relationship with the host side wireless communication device 10A with the upper level protocol processing unit 203 (step S322). If communication from the guest side wireless communication device 10B to the host side wireless communication device 10A is made (step S323), the communication to the host side wireless communication device 10A is carried out (step S324). When determined that the connection time defined by the upper level protocol has elapsed by the long cycle pause management unit 204 (step S325), the guest side wireless communication device 10B again returns to step S301, and the long cycle pause operation is repeated.

If the communication demand from the guest side wireless communication device 10B to the host side wireless communication device 10A is not made in step S312, and the beacon is not transmitted from itself to actively communicate, the guest side wireless communication device 10B determines whether or not beacon from the host side wireless communication device 10A is received by the beacon reception unit 209 (step S326).

If determined that the beacon from the host side wireless communication device 10A is received, the guest side wireless communication device 10B records the reception time of the received beacon (host beacon) by, for example, the beacon reception unit 209 (step S327). Furthermore, the guest side wireless communication device 10B acquires the time information on the timing the host beacon is received by, for example, the beacon reception unit 209 (step S328). Whether there is a difference in the synchronization time of the long cycle counter of the guest side wireless communication device 10B is determined by the long cycle pause management unit 204 (step S329), and the value of the long cycle synchronization counter of the guest side wireless communication device 10B is corrected by the long cycle pause management unit 204 if difference is found as a result of the determination (step S330).

If determined that the beacon from the host side wireless communication device 10A is not received as a result of the determination in step S326, the guest side wireless communication device 10B acquires the time the host beacon is received the last by the counterpart host connection monitoring unit 207 (step S331). If determined that the beacon from the host side wireless communication device 10A is not received for a long time (e.g., one day) (step S332), the pairing processing unit 206 cancels the connection with the host side wireless communication device 10A and cancels pairing (step S333).

The series of operations described above are such that the guest side wireless communication device 10B maintains the operation of the guest by returning the process to step S301 and repeating the operation.

The operation of the guest side wireless communication device 10B according to the embodiment of the present invention has been described above. The process of setting the beacon slot according to the embodiment of the present invention will now be described.

[3-9. Process of Setting Beacon Slot]

Figure 13:
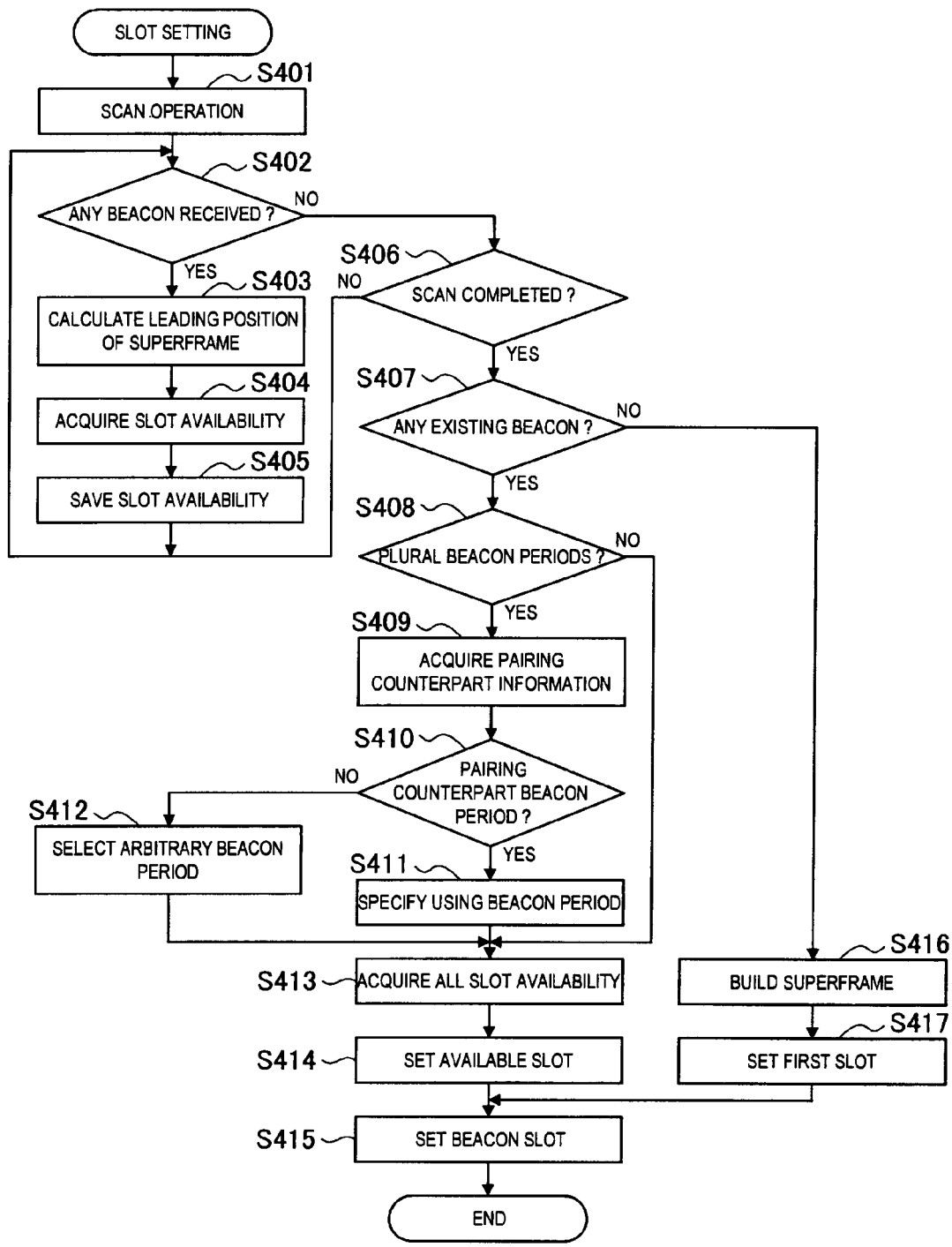
FIG. 13 is a flowchart for describing a process of setting a beacon slot according to the embodiment of the present invention.

FIG. 13 is a flowchart for describing the process of setting a beacon slot according to the embodiment of the present invention. The processes shown in FIG. 13 are examples of the processes in step S101 of FIG. 10, step S203 of FIG. 11, and step S306 and step S314 of FIG. 12. The process of setting the beacon slot according to the embodiment of the present invention will be described below. In the following description, the process of setting the beacon slot in the host side wireless communication device 10A will be described as an example. The following processes can be executed by the beacon slot management unit 110 of the host side wireless communication device 10A or the beacon slot management unit 210 of the guest side wireless communication device 10B, but it should be recognized that the present invention is not limited to such example.

In order to set the beacon slot in the host side wireless communication device 10A, the scan operation of continuously performing the reception operation over a predetermined time is carried out (step S401). Whether or not the beacon from the peripheral wireless communication device is received as a result of the scan operation is determined (step S402).

If the beacon from the peripheral wireless communication device is received as a result of the determination in step S402, the head position of the superframe is calculated from the received timing (step S403). The utility state of the beacon slot is also acquired from the described state of the beacon period utility information element contained in the received beacon (step S404), and the slot utility state in the beacon period is saved (step S405). In the present embodiment, the host side wireless communication device 10A may be configured to perform the scan operation over a time corresponding to a plurality of superframe cycles.

The host side wireless communication device 10A repeats the above process until the scan operation is completed (step S406). Whether or not an existing beacon is received is determined before after the scan operation is completed (step S407), and whether or not a plurality of beacon periods in which the head position of the superframe does not match is present is also determined (step S408). If the existing beacon is received and the plurality of beacon periods in which the head position of the superframe does not match is present, the information on the pairing counterpart is acquired (step S409). Whether or not the beacon period of the paring counterpart exists is determined as a result of acquiring the information on the pairing counterpart (step S410). If the beacon period of the pairing counterpart is present as a result of the determination of step S410, such beacon period is determined as the beacon period to be used (step S411). If determination is made that the beacon period of the pairing counterpart is not present or the pairing counterpart does not exist as a result of the determination of step S410, one arbitrary beacon period is selected and determined as the beacon period to be used (step S412).

After the beacon period is determined in step S411 or step S412, or when determined that only one beacon period exists in step S408, the utility state of all beacon slots is acquired (step S413). As a result of acquiring the utility state of all beacon slots, the beacon slot it can use is specified (step S414), and the available vacant beacon slot with the youngest number is set as the own beacon slot according to a predetermined rule (step S415).

If determined that the beacon is not received before the scan operation is completed in step S407, the host side wireless communication device 10A itself builds the head position of the superframe (step S416). The first beacon slot at the head position of the superframe it built is set (step S417), and the first beacon slot is set as the own beacon slot (step S415).

The process of setting the beacon slot according to the embodiment of the present invention has been described above.

<4. Summary>

As described above, according to the embodiment of the present invention, the pause state of longer cycle than the hibernation period of the related art can be set, and a low power consumption operation more effective than the related art can be performed. Upon setting the pause state of long cycle, the pairing is performed between the wireless communication devices so that only the connection relationship with the minimal wireless communication device is to be maintained. Therefore, the operation of the complex network management can be simplified and the mounting is also facilitated.

That is, the host side wireless communication device and the guest side wireless communication device are paired in advance and the connection is established therebetween, so that the negotiation process for establishing a new connection relationship is unnecessary when the counterpart wireless communication device is found. If the negotiation process is unnecessary, the connection can be established between the host side wireless communication device and the guest side wireless communication device in a short period of time.

According to the embodiment of the present invention, the host side wireless communication device performs the scan operation over a time of integral multiples of the predetermined superframe cycle to grasp the existence of other wireless communication devices existing at the periphery after pausing for a long cycle. The beacon period can be built in subordination to the wireless communication device that appeared during the pause according to the scan operation after the pause operation.

The host side wireless communication device is started after the pause period of long cycle is terminated, and continues to transmit the beacon signal, so that synchronization can be maintained even when shift of clock exists with the guest side wireless communication device. In the guest side wireless communication device, synchronization is taken by receiving the beacon of the host side wireless communication device, so that low power consumption operation can be realized while taking synchronization with the host side wireless communication device even if the beacon is not transmitted over a certain long time.

The guest side wireless communication device performs the scan operation over a time of integral multiples of the predetermined superframe cycle when the data transmission demand is made, for example, and builds the beacon period in subordination to the wireless communication device that becomes the host. The process of entering a complex network can be simplified by building the beacon period.

The host side wireless communication device and the guest side wireless communication device operate in the beacon period in which the pairing counterpart exists even when a plurality of beacon periods is detected at the time of the scan operation, so that the desired data exchange can be easily carried out.

When the notification parameter from the guest side wireless communication device to the host side wireless communication device exists, notification is made using the beacon from the guest side wireless communication device so that exchange of short information can be carried out without establishing a complicating connection relationship.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-3973 filed in the Japan Patent Office on Jan. 9, 2009, the entire content of which is hereby incorporated by reference.

The embodiment of the present invention is applicable to a wireless communication device, a wireless communication system, a wireless communication method, and a computer program.

What is claimed is:

1. A wireless communication system comprising:
a first wireless communication device; and
a second wireless communication device,
wherein the first wireless communication device includes:
  a beacon signal exchanging unit for exchanging a plurality of beacon signals with the second wireless communication device;
  a connection management unit for establishing a connection relationship with the second wireless communication device by exchanging at least one of the plurality of beacon signals;
  a pause management unit for exchanging information on a predetermined pause period with the second wireless communication device, with which the connection relationship is established, and pausing the own operation until the predetermined pause period has elapsed from a predetermined time; and
  a beacon slot management unit for setting a beacon slot to be used for transmission of the plurality of beacon signals,
the beacon slot management unit sets the beacon slot after elapse of the predetermined pause period,
the beacon signal exchanging unit transmits at least two of the plurality of beacon signals for a predetermined time interval using the beacon slot after the predetermined pause period has elapsed and the beacon slot is set,
the second wireless communication device includes:
  a beacon signal exchanging unit for exchanging a the plurality of beacon signals with the first wireless communication device;
  a connection management unit for establishing a connection relationship with the first wireless communication device by exchanging at least one of the plurality of beacon signals;
  a pause management unit for exchanging information on a predetermined pause period with the first wireless communication device, with which the connection relationship is established, and pausing the own operation until the predetermined pause period has elapsed from the predetermined time; and
  a beacon slot management unit for setting a beacon slot to be used for transmission of the beacon signal, and
the pause management unit executes a predetermined operation in subordination to at least one of the plurality of beacon signals, transmitted from the first wireless communication device during the predetermined time interval, received by the beacon signal exchanging unit after elapse of the predetermined pause period.

2. A wireless communication device comprising:
a beacon signal exchanging unit for exchanging a plurality of beacon signals with another wireless communication device;
a connection management unit for establishing a connection relationship with the another wireless communication device by exchanging at least one of the plurality of beacon signals;
a pause management unit for exchanging information on a predetermined pause period with the another wireless communication device, with which the connection relationship is established, and pausing the own operation until the predetermined pause period has elapsed from the predetermined time; and
a beacon slot management unit for setting a beacon slot to be used for transmission of the beacon signal, wherein
the beacon slot management unit sets the beacon slot after elapse of the predetermined pause period, and
the beacon signal exchanging unit transmits at least two of the plurality of beacon signals for a predetermined time interval using the beacon slot after the predetermined pause period has elapsed and the beacon slot is set.

3. The wireless communication device according to claim 2, wherein
the beacon slot management unit builds a superframe after elapse of the predetermined pause period,
the beacon signal exchanging unit transmits the plurality of beacon signals based on the superframe built by the beacon slot management unit, and
the pause management unit again pauses the own operation until the predetermined pause period has elapsed when the beacon signal exchanging unit transmits at least one of the plurality of beacon signals for a predetermined number of times after the elapse of the predetermined pause period.

4. The wireless communication device according to claim 2, wherein the beacon signal exchanging unit transmits information to be notified to the another wireless communication device by being embedded in at least one of the plurality of beacon signals to be transmitted to the another wireless communication device after the elapse of the predetermined pause period.

5. The wireless communication device according to claim 2, wherein when a communication demand with the another wireless communication device is detected after the elapse of the predetermined pause period, information for transitioning the another wireless communication device to an operating state is transmitted to the another wireless communication device.

6. The wireless communication device according to claim 5, wherein the beacon signal exchanging unit transmits information for transitioning the another wireless communication device to the operating state by being embedded in at least one of the plurality of beacon signals to be transmitted to the another wireless communication device.

7. The wireless communication device according to claim 5, wherein when grasping that the another wireless communication device transitioned to the operating state and the information to be notified to the another wireless communication device is transmitted, the pause management unit again pauses the own operation until the predetermined pause period has elapsed.

8. The wireless communication device according to claim 2, wherein the connection management unit cancels the connection relationship with the another wireless communication device when grasping that the plurality of beacon signals transmitted by the beacon signal exchanging unit are not recognized by the another wireless communication device for a predetermined startup check period.

9. A wireless communication device comprising:
a beacon signal exchanging unit for exchanging a plurality of beacon signals with another wireless communication device;
a connection management unit for establishing a connection relationship with the another wireless communication device by exchanging at least one of the plurality of beacon signals;
a pause management unit for exchanging information on a predetermined pause period with the another wireless communication device, with which the connection relationship is established, and pausing the own operation until the predetermined pause period has elapsed from the predetermined time; and
a beacon slot management unit for setting a beacon slot to be used for transmission of at least two of the plurality of beacon signals, wherein
the pause management unit executes a predetermined operation in subordination to the at least two of the plurality of beacon signals, transmitted from the another wireless communication device, during the predetermined time interval received by the beacon signal exchanging unit after elapse of the predetermined pause period.

10. The wireless communication device according to claim 9, wherein the beacon slot management unit builds a superframe after elapse of the predetermined pause period,
the beacon signal exchanging unit transmits at least one of the plurality of beacon signals based on the superframe built by the beacon slot management unit, and
the pause management unit again pauses the own operation until the predetermined pause period has elapsed when grasping that the plurality of beacon signals transmitted by the beacon signal exchanging unit is recognized by the another wireless communication device.

11. The wireless communication device according to claim 9, wherein the beacon signal exchanging unit transmits information to be notified to the another wireless communication device by being embedded in at least one of the plurality of beacon signals to be transmitted to the another wireless communication device after the elapse of the predetermined pause period.

12. The wireless communication device according to claim 9, wherein when a communication demand with the another wireless communication device is detected after the elapse of the predetermined pause period, information for transitioning the another wireless communication device to an operating state is transmitted to the another wireless communication device.

13. The wireless communication device according to claim 12, wherein the beacon signal exchanging unit transmits information for transitioning the another wireless communication device to the operating state by being embedded in at least one of the plurality of beacon signals to be transmitted to the another wireless communication device.

14. The wireless communication device according to claim 12, wherein when grasping that the another wireless communication device transitioned to the operating state and the information to be notified to the another wireless communication device is transmitted, the pause management unit again pauses the own operation until the predetermined pause period has elapsed.

15. The wireless communication device according to claim 9, wherein the connection management unit cancels the connection relationship with the another wireless communication device when grasping that the plurality of beacon signals transmitted by the beacon signal exchanging unit is not recognized by the another wireless communication device for a predetermined startup check period.

16. A wireless communication method, comprising the steps of:
exchanging a plurality of beacon signals with another wireless communication device;
establishing a connection relationship with the another wireless communication device by exchanging at least one of the plurality of beacon signals;
exchanging information on a predetermined pause period with the another wireless communication device, with which the connection relationship is established;
pausing the own operation until the predetermined pause period has elapsed from the predetermined time; and
executing a predetermined operation in subordination to at least two of the plurality of beacon signals, transmitted from the another wireless communication device, received in the beacon signal exchanging step as the predetermined time interval, after elapse of the predetermined pause period.

17. A non-transitory computer readable storage medium having stored thereon a computer program for causing a computer to execute the steps of:
exchanging a plurality of beacon signals with another wireless communication device;
establishing a connection relationship with the another wireless communication device by exchanging at least one of the plurality of beacon signals;
exchanging information on a predetermined pause period with the another wireless communication device, with which the connection relationship is established;
pausing the own operation until the predetermined pause period has elapsed from the predetermined time; and
executing a predetermined operation in subordination to at least two of the plurality of beacon signals, transmitted from the another wireless communication device, received in the beacon signal exchanging step, after elapse of the predetermined pause period.

* * * * *